United States Patent
He et al.

(10) Patent No.: US 10,873,088 B2
(45) Date of Patent: *Dec. 22, 2020

(54) LITHIUM-SELENIUM BATTERY CONTAINING AN ELECTRODE-PROTECTING LAYER AND METHOD OF IMPROVING CYCLE-LIFE

(71) Applicant: Global Graphene Group, Inc., Dayton, OH (US)

(72) Inventors: Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,959

(22) Filed: Aug. 28, 2018

(65) Prior Publication Data

US 2019/0393510 A1    Dec. 26, 2019

Related U.S. Application Data

(63) Continuation-in-part of application No. 16/017,294, filed on Jun. 25, 2018.

(51) Int. Cl.
*H01M 4/62* (2006.01)
*H01M 10/052* (2010.01)
(Continued)

(52) U.S. Cl.
CPC .......... *H01M 4/628* (2013.01); *H01M 4/382* (2013.01); *H01M 4/581* (2013.01); *H01M 4/625* (2013.01);
(Continued)

(58) Field of Classification Search
None
See application file for complete search history.

(56) References Cited

U.S. PATENT DOCUMENTS 2,798,878 A    7/1957  Hummers
3,836,511 A    9/1974  O'farrell et al.
(Continued)

FOREIGN PATENT DOCUMENTS

CN    103258990 A    8/2013
CN    105322132 A    2/2016
(Continued)

OTHER PUBLICATIONS

Elabd et al., "Sulfonation and Characterization of Poly(styrene-isobutylene-styrene) Triblock Copolymers at High Ion-Exchange Capacities" Polymer (2004) vol. 45, pp. 3037-3043.
(Continued)

*Primary Examiner* — Scott J. Chmielecki

(57) ABSTRACT

Provided is a lithium-selenium battery, comprising a cathode, an anode, and a porous separator/electrolyte assembly, wherein the anode comprises an anode active layer containing lithium or lithium alloy as an anode active material, and the cathode comprises a cathode active layer comprising a selenium-containing material, wherein an anode-protecting layer is disposed between the anode active layer and the separator/electrolyte and/or a cathode-protecting layer is disposed between the cathode active layer and the separator/electrolyte; the protecting layer comprising from 0.01% to 40% by weight of a conductive reinforcement material and from 0.01% to 40% by weight of an electrochemically stable inorganic filler dispersed in a sulfonated elastomeric matrix material and having a thickness from 1 nm to 100 μm, a fully recoverable tensile strain from 2% to 500%, a lithium ion
(Continued)

conductivity from $10^{-7}$ S/cm to $5\times10^{-2}$ S/cm, and an electrical conductivity from $10^{-7}$ S/cm to 100 S/cm.

19 Claims, 3 Drawing Sheets

(51) Int. Cl.
  *H01M 4/58* (2010.01)
  *H01M 4/38* (2006.01)
  *H01M 10/42* (2006.01)
  *H01M 10/058* (2010.01)

(52) U.S. Cl.
  CPC ....... *H01M 10/052* (2013.01); *H01M 10/058* (2013.01); *H01M 10/4235* (2013.01); *H01M 2300/0037* (2013.01)

(56) References Cited

U.S. PATENT DOCUMENTS

| | | |
|---|---|---|
| 4,720,910 A | 1/1988 | Rourke et al. |
| 5,057,339 A | 10/1991 | Ogawa |
| 5,270,417 A | 12/1993 | Soga et al. |
| 5,342,710 A | 8/1994 | Koksbang |
| 5,350,647 A | 9/1994 | Hope et al. |
| 5,409,785 A | 4/1995 | Nakano et al. |
| 5,424,151 A | 6/1995 | Koksbang et al. |
| 5,434,021 A | 7/1995 | Fauteux et al. |
| 5,460,905 A | 10/1995 | Skotheim |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,218,055 B1 | 4/2001 | Shah et al. |
| 6,447,952 B1 | 9/2002 | Spiegel et al. |
| 6,451,484 B1 | 9/2002 | Han et al. |
| 6,475,678 B1 | 11/2002 | Suzuki |
| 6,515,101 B1 | 2/2003 | Sheares |
| 6,620,547 B1 | 9/2003 | Sung et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,618,678 B2 | 11/2009 | Mao et al. |
| 8,597,828 B2 | 12/2013 | Martinet et al. |
| 9,905,856 B1 | 2/2018 | Zhamu et al. |
| 10,084,182 B2 | 9/2018 | Pan et al. |
| 10,483,533 B2 | 11/2019 | Zhamu et al. |
| 2002/0034685 A1 | 3/2002 | Sato et al. |
| 2002/0182488 A1 | 12/2002 | Cho et al. |
| 2002/0195591 A1 | 12/2002 | Ravet et al. |
| 2003/0180619 A1 | 9/2003 | Tamura et al. |
| 2004/0018430 A1 | 1/2004 | Holman et al. |
| 2005/0034993 A1 | 2/2005 | Gozdz et al. |
| 2005/0098914 A1 | 5/2005 | Varma et al. |
| 2005/0118508 A1 | 6/2005 | Yong et al. |
| 2005/0136330 A1 | 6/2005 | Mao et al. |
| 2006/0263697 A1 | 11/2006 | Dahn et al. |
| 2007/0218369 A1 | 9/2007 | Kaiduka et al. |
| 2007/0289879 A1 | 12/2007 | Horton |
| 2008/0248393 A1 | 10/2008 | Richard et al. |
| 2008/0318128 A1 | 12/2008 | Simoneau et al. |
| 2009/0155676 A1 | 6/2009 | Zhamu et al. |
| 2009/0169725 A1 | 7/2009 | Zhamu et al. |
| 2010/0099029 A1 | 4/2010 | Kinoshita et al. |
| 2010/0112454 A1 | 5/2010 | Visco et al. |
| 2010/0143798 A1 | 6/2010 | Zhamu et al. |
| 2010/0173198 A1 | 7/2010 | Zhamu et al. |
| 2011/0059361 A1 | 3/2011 | Wilkening et al. |
| 2011/0104571 A1 | 5/2011 | Zhamu et al. |
| 2011/0143211 A1 | 6/2011 | Takeyama |
| 2011/0177388 A1 | 7/2011 | Bae et al. |
| 2011/0244337 A1 | 10/2011 | Ohta et al. |
| 2011/0262816 A1 | 10/2011 | Amatucci |
| 2012/0064409 A1 | 3/2012 | Zhamu et al. |
| 2012/0070708 A1 | 3/2012 | Ohira et al. |
| 2012/0088154 A1 | 4/2012 | Liu et al. |
| 2013/0052544 A1 | 2/2013 | Ohkubo et al. |
| 2013/0054061 A1 | 2/2013 | Nishimoto |
| 2013/0157141 A1 | 6/2013 | Zhong et al. |
| 2013/0164615 A1 | 6/2013 | Manthiram et al. |
| 2013/0171339 A1 | 7/2013 | Wang et al. |
| 2013/0224603 A1 | 8/2013 | Chen et al. |
| 2013/0292613 A1 | 11/2013 | Wegner et al. |
| 2014/0072879 A1 | 3/2014 | Chen et al. |
| 2014/0147738 A1 | 5/2014 | Chen et al. |
| 2014/0147751 A1 | 5/2014 | Yang et al. |
| 2014/0154572 A1 | 6/2014 | Singh et al. |
| 2014/0162121 A1 | 6/2014 | Ryu et al. |
| 2014/0178747 A1 | 6/2014 | Tsai et al. |
| 2014/0234702 A1 | 8/2014 | Zhang et al. |
| 2014/0235513 A1 | 8/2014 | Kverel et al. |
| 2014/0363746 A1 | 12/2014 | He et al. |
| 2015/0044556 A1 | 2/2015 | Wang et al. |
| 2015/0064568 A1 | 3/2015 | Yushin et al. |
| 2015/0064574 A1 | 3/2015 | He et al. |
| 2015/0079485 A1 | 3/2015 | Choi et al. |
| 2015/0162641 A1 | 6/2015 | Visco et al. |
| 2015/0180000 A1 | 6/2015 | Roumi |
| 2015/0180037 A1 | 6/2015 | Gronwald et al. |
| 2015/0218323 A1 | 8/2015 | Kim et al. |
| 2015/0221935 A1 | 8/2015 | Zhou et al. |
| 2015/0236372 A1 | 8/2015 | Yushin et al. |
| 2015/0244025 A1 | 8/2015 | Rhee et al. |
| 2015/0318532 A1 | 11/2015 | Manthiram et al. |
| 2015/0325844 A1 | 11/2015 | Inoue |
| 2015/0372294 A1 | 12/2015 | Minami et al. |
| 2016/0013481 A1 | 1/2016 | Jeong et al. |
| 2016/0043384 A1 | 2/2016 | Zhamu et al. |
| 2016/0087266 A1 | 3/2016 | Muldoon et al. |
| 2016/0126543 A1 | 5/2016 | Ota et al. |
| 2016/0149216 A1 | 5/2016 | Mizuno et al. |
| 2016/0181611 A1 | 6/2016 | Cho et al. |
| 2016/0218341 A1 | 7/2016 | Kumar et al. |
| 2016/0240896 A1 | 8/2016 | Zhang et al. |
| 2016/0301075 A1 | 10/2016 | Zhamu et al. |
| 2016/0344035 A1 | 11/2016 | Zhamu et al. |
| 2016/0351877 A1 | 12/2016 | Kusachi et al. |
| 2016/0351909 A1 | 12/2016 | Bittner et al. |
| 2016/0372743 A1 | 12/2016 | Cho et al. |
| 2016/0372784 A1 | 12/2016 | Hayner et al. |
| 2017/0002154 A1 | 1/2017 | Hiasa et al. |
| 2017/0018799 A1 | 1/2017 | Jeong |
| 2017/0033357 A1 | 2/2017 | Cho et al. |
| 2017/0047584 A1 | 2/2017 | Hwang et al. |
| 2017/0062830 A1 | 3/2017 | Bao et al. |
| 2017/0092986 A1 | 3/2017 | Ogawa et al. |
| 2017/0098824 A1 | 4/2017 | Fasching et al. |
| 2017/0098856 A1 | 4/2017 | Zhamu et al. |
| 2017/0104204 A1 | 4/2017 | Zhamu et al. |
| 2017/0104217 A1 | 4/2017 | Yu et al. |
| 2017/0117535 A1 | 4/2017 | Yoon et al. |
| 2017/0117538 A1 | 4/2017 | Bendimerad et al. |
| 2017/0117589 A1 | 4/2017 | Tajima et al. |
| 2017/0141387 A1 | 5/2017 | Hayner et al. |
| 2017/0141399 A1 | 5/2017 | Lux et al. |
| 2017/0166722 A1 | 6/2017 | Zhamu et al. |
| 2017/0179468 A1 | 6/2017 | Fanous et al. |
| 2017/0194640 A1 | 7/2017 | Bucur et al. |
| 2017/0194648 A1 | 7/2017 | Bucur et al. |
| 2017/0200943 A1 | 7/2017 | Kawakami |
| 2017/0207484 A1 | 7/2017 | Zhamu et al. |
| 2017/0288211 A1 | 10/2017 | Zhamu et al. |
| 2017/0294643 A1 | 10/2017 | Burshtain et al. |
| 2017/0309917 A1 | 10/2017 | Lee et al. |
| 2017/0338472 A1 | 11/2017 | Zhamu et al. |
| 2017/0338474 A1 | 11/2017 | Lee et al. |
| 2017/0338490 A1 | 11/2017 | Xiao et al. |
| 2018/0053978 A1 | 2/2018 | Song et al. |
| 2018/0083265 A1 | 3/2018 | Singh et al. |

(56) References Cited

U.S. PATENT DOCUMENTS

| | | | |
|---|---|---|---|
| 2018/0219215 A1 | 8/2018 | Bucur et al. | |
| 2018/0233736 A1 | 8/2018 | Zhamu et al. | |
| 2018/0241031 A1 | 8/2018 | Pan et al. | |
| 2018/0241032 A1 | 8/2018 | Pan et al. | |
| 2018/0248173 A1 | 8/2018 | Pan et al. | |
| 2018/0277913 A1 | 9/2018 | Pan et al. | |
| 2018/0287142 A1 | 10/2018 | Zhamu et al. | |
| 2018/0294475 A1 | 10/2018 | Zhamu et al. | |
| 2018/0294476 A1 | 10/2018 | Zhamu et al. | |
| 2018/0301707 A1 | 10/2018 | Pan et al. | |
| 2019/0051905 A1 | 2/2019 | Zhamu et al. | |
| 2019/0058185 A1 | 2/2019 | Lee et al. | |
| 2019/0077669 A1 | 3/2019 | Zhamu et al. | |
| 2019/0088958 A1 | 3/2019 | Viner et al. | |
| 2019/0260028 A1 | 8/2019 | Zhamu et al. | |
| 2019/0319303 A1 | 10/2019 | Kushida et al. | |
| 2019/0386332 A1* | 12/2019 | Zhamu | H01M 4/366 |
| 2019/0393466 A1 | 12/2019 | Lin et al. | |
| 2019/0393495 A1* | 12/2019 | He | H01M 4/134 |
| 2019/0393510 A1* | 12/2019 | He | H01M 4/136 |
| 2019/0393543 A1* | 12/2019 | Zhamu | H01M 4/622 |

FOREIGN PATENT DOCUMENTS

| | | |
|---|---|---|
| CN | 108899472 A | 11/2018 |
| EP | 2787563 A1 | 10/2014 |
| JP | 1275613 A | 11/1989 |
| JP | 2010160984 A | 7/2010 |
| JP | 2011524611 A | 9/2011 |
| JP | 2015084320 A | 4/2015 |
| JP | 2015176656 A | 10/2015 |
| KR | 1020030050475 A | 6/2003 |
| KR | 100670527 B1 | 1/2007 |
| KR | 1020100138607 A | 12/2010 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170001069 U | 3/2017 |
| KR | 1020170086003 A | 7/2017 |
| KR | 1020170126404 A | 11/2017 |
| KR | 1020180035752 A | 4/2018 |
| WO | 2007108424 A1 | 9/2007 |
| WO | 2015141799 A1 | 9/2015 |
| WO | 2016015915 A1 | 2/2016 |
| WO | 2017172104 A1 | 10/2017 |
| WO | 2017200798 A1 | 11/2017 |
| WO | 2018075538 A1 | 4/2018 |
| WO | 2018148090 A1 | 8/2018 |

OTHER PUBLICATIONS

Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
PCT/US20/14869 International Search Report and Written Opinion dated May 19, 2020, 13 pages.
U.S. App. No. 14/999,080 Nonfinal Office Action dated Nov. 9, 2018,.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/434,632 Nonfinal Office Action dated Jun. 26, 2020, 19 pages.
U.S. Appl. No. 15/442,278 Final Office Action dated Oct. 21, 2019, 16 pages.
U.S. Appl. No. 15/442,278 Nonfinal Office Action dated Feb. 28, 2020, 16 pages.
U.S. Appl. No. 15/442,803 Final Office Action dated Feb. 24, 2020, 36 pages.
U.S. Appl. No. 15/442,803 Nonfinal Office Action dated Dec. 28, 2018, 24 pages.
U.S. Appl. No. 15/442,803 Nonfinal Office Action dated Jul. 20, 2020, 8 pages.
U.S. 15/442,803 Nonfinal Office Action dated Jul. 25, 2019, 37 pages.
U.S. Appl. 15/442,807 Nonfinal Office Action dated Dec. 14, 2018, 7 pages.
U.S. Appl. No. 15/478,125 Final Office Action dated Aug. 23, 2019, 14 pages.
U.S. Appl. No. 15/478,125 Nonfinal Office Action dated Mar. 5, 2020, 11 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Final Office Action dated Dec. 27, 2019, 22 pages.
U.S. Appl. No. 15/483,347 Nonfinal Office Action dated Jun. 17, 2020, 14 pages.
U.S. Appl. No. 15/483,347 Nonfinal Office Action dated Nov. 2, 2018, 20 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Apr. 9, 2019, 28 pages.
U.S. Appl. No. 15/483,348 Final Office Action dated Jan. 20, 2020, 9 pages.
U.S. Appl. No. 15/483,348 Nonfinal Office Action dated Nov. 21, 2018, 22 pages.
U.S. Appl. No. 15/483,348 Nonfinal Office Action dated Sep. 16, 2019, 22 pages.
U.S. Appl. No. 15/485,934 Nonfinal Office Action dated May 26, 2020, 12 pages.
U.S. Appl. No. 15/676,677 Nonfinal Office Action dated Feb. 5, 2020, 15 pages.
U.S. Appl. No. 15/676,680 Nonfinal Office Action dated May 20, 2020, 8 pages.
U.S. Appl. No. 15/901,367 Nonfinal Office Action dated Jun. 10, 2019, 12 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/903,808 Nonfinal Office Action dated Jan. 28, 2020, 8 pages.
U.S. Appl. No. 15/910,465 Final Office Action dated May 15, 2020, 13 pages.
U.S. Appl. No. 15/910,465 Nonfinal Office Action dated Nov. 1, 2019, 12 pages.
U.S. Appl. No. 15/910,471 Nonfinal Office Action dated May 13, 2020, 11 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 15/954,088 Nonfinal Office Action dated Mar. 13, 2020, 9 pages.
U.S. Appl. No. 16/010,213 Nonfinal Office Action dated Mar. 27, 2020, 12 pages.
U.S. Appl. No. 16/010,225 Final Office Action dated Jul. 8, 2020, 7 pages.

(56) References Cited

OTHER PUBLICATIONS

U.S. Appl. No. 16/010,225 Nonfinal Office Action dated Mar. 27, 2020, 13 pages.
U.S. Appl. No. 16/010,965 Nonfinal Office Action dated Jan. 8, 2020, 5 pages.
U.S. Appl. No. 16/010,975 Nonfinal Office Action dated Jan. 8, 2020, 5 pages.
U.S. Appl. No. 16/014,623 Final Office Action dated Apr. 9, 2020, 14 pages.
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.
U.S. Appl. No. 16/113,676 Nonfinal Office Ation dated Oct. 4, 2019, 9 pages.
U.S. Appl. No. 16/113,676 Final Office Action dated Apr. 9, 2020, 15 pages.
U.S. Appl. No. 16/116,329 Final Office Action dated Jul. 23, 2020, 6 pages.
U.S. Appl. No. 16/116,329 Nonfinal Office Action dated Mar. 30, 2020, 6 pages.
U.S. Appl. No. 16/116,341 Final Office Action dated Jul 23, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/120,875 Nonfinal Office Action dated Oct. 4, 2019, 10 pages.
U.S. Appl. No. 16/123,218 Final Office Action dated Apr. 9, 2020, 13 pages.
U.S. Appl. No. 16/123,218 Nonfinal Office Action dated Oct. 4, 2019, 9 pages.
U.S. Appl. No. 16/126,736 Final Office Action dated Jul. 23, 2020, 6 pages.
U.S. Appl. No. 16/126,736 Nonfinal Office Action dated Mar. 30, 2020, 6 pages.
U.S. Appl. No. 16/126,745 Final Office Action dated Jul. 23, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office action dated Apr. 9, 2020, 12 pages.
U.S. Appl. No. 16/166,574 Nonfinal Office Action dated Oct. 4, 2019, 9 pages.
U.S. Appl. No. 16/238,052 Nonfinal Office Action dated Apr. 3, 2020, 14 pages.
U.S. Appl. No. 16/256,321 Nonfinal Office Action dated Jul. 27, 2020, 8 pages.
U.S. Appl. No. 16/256,346 Nonfinal Office Action dated May 19, 2020, 16 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
"Nylon" en.wikipedia.org/wiki/Nylon. Accessed Feb. 18, 2020 (Year: 2020).
An et al., "Diameter-Selected Synthesis of Single Crystalline Trigonal Selenium Nanowires" Materials Chemistry and Physics (2007) vol. 101, No. 2-3, pp. 357-361.
An et al., "Large-Scale Synthesis of High Quality Trigonal Selenium Nanowires" European Journal of Inorganic Chemistry (2003) vol. 17, pp. 3250-3255.
Arai et al., "Versatile supramolecular cross-linker: a rotaxane cross-linker that directly endows vinyl polymers with movable cross-links" Chemistry (2013) vol. 19, pp. 5917-5923.
AZO Materials Table of Properties on Styrene Butadiene Rubber, 5 pages.
Buonerba et al., "Novel Synthetic Strategy for the Sulfonation of Polybutadiene and Styrene-Butadiene Copolymers" Macromolecules (2013) vol. 46, pp. 778-784.
Chen et al., "Selenium nanowires and nanotubes synthesized via a facile template-free solution method" Materials Research Bulletin (2010) vol. 45, pp. 699-704.
Choi et al., "Highly elastic binders integrating polyrotaxanes for silicon microparticle anodes in lithium ion batteries" Science (2017) vol. 357, No. 6348, pp. 279-283.
Dwivedi et al., "An Organic Acid-induced Synthesis and Characterization of Selenium Nanoparticles" Journal of Nanotechnology (2011) Article ID 651971, 6 pages.
Fan et al., "Hollow selenium encapsulated into 3D graphene hydrogels for lithium-selenium batteries with high rate performance and cycling stability" RSC Adv. (2017) vol. 7, pp. 21281-21286.
Gao et al., "Hollow Sphere Selenium Nanoparticles: Their In-Vitro Anti Hydroxyl Radical Effect" Advanced Materials (2002), vol. 14, No. 4, pp. 290-293.
Habib et aL, "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
Ji et al., "A highly ordered nanostructured carbon—sulphur cathode for lithium—sulphur batteries" Nature Materials (2009) vol. 8, pp. 500-506.
Karlicky et al., "Halogenated Graphenes: Rapidly Growing Family of Graphene Derivatives" ACS Nano (2013) vol. 7, No. 8, pp. 6434-6464.
KR-10-2015-0044333 English language translation.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Liu et al., "Solutions for the problems of silicon-carbon anode materials for lithium-ion batteries" Royal Society Open Science (2018) vol. 5, p. 172370.
Luesakul et al., "Shape-controlled synthesis of cubic-like selenium nanoparticles via the self-assembly method" Carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.

(56) References Cited

OTHER PUBLICATIONS

PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.
PCT/US19/21137 International Search Report and Written Opinion dated Jun. 18, 2019, 13 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
PCT/US19/38881 International Search Report and Written Opinion dated Oct. 18, 2019, 14 pages.

\* cited by examiner

LITHIUM-SELENIUM BATTERY CONTAINING AN ELECTRODE-PROTECTING LAYER AND METHOD OF IMPROVING CYCLE-LIFE

CROSS REFERENCE TO RELATED APPLICATIONS

The present application is a continuation-in-part of U.S. patent application Ser. No. 16/017,294, filed Jun. 25, 2018, which is hereby incorporated by reference for all purposes.

FIELD OF THE INVENTION

The present invention relates to the field of rechargeable lithium-selenium battery having a lithium metal layer (in a form of thin lithium foil, coating, or sheet of lithium particles) as an anode active material and a cathode containing selenium- or lithium selenide-based cathode active material.

BACKGROUND OF THE INVENTION

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-180 mAh/g. As a result, the specific energy of commercially available Li-ion cells is typically in the range from 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). With a significantly higher electronic conductivity compared to S, Se is a more effective cathode active material and, as such, Li—Se potentially can exhibit a higher rate capability.

However, Li—Se cell is plagued with several major technical problems that have hindered its widespread commercialization:

(1) All prior art Li—Se cells have dendrite formation and related internal shorting issues;

(2) The cell tends to exhibit significant capacity decay during discharge-charge cycling. This is mainly due to the high solubility of selenium and lithium poly selenide anions formed as reaction intermediates during both discharge and charge processes in the polar organic solvents used in electrolytes. During cycling, the anions can migrate through the separator to the Li negative electrode whereupon they are reduced to solid precipitates, causing active mass loss. In addition, the solid product that precipitates on the surface of the positive electrode during discharge becomes electrochemically irreversible, which also contributes to active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into the mesoscaled pores of these materials using a physical vapor deposition or solution precipitation process. Typically the maximum loading of Se in these porous carbon structures is less than 50% by weight (i.e. the amount of active material is less than 50%; more than 50% being inactive materials).

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electro-active cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-selenium secondary battery if dendrite related issues could be addressed.

Hence, an object of the present invention is to provide a rechargeable Li—Se battery that exhibits an exceptionally high specific energy or high energy density. One particular technical goal of the present invention is to provide a Li metal-selenium with a cell specific energy greater than 300 Wh/kg, preferably greater than 350 Wh/kg, and more preferably greater than 400 Wh/kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium cell based on rational materials and battery designs that overcome or significantly reduce the following issues commonly associated with conventional Li—Se cells: (a) dendrite formation (internal shorting); (b) low electric and ionic conductivities of selenium, requiring large proportion (typically 30-55%) of non-active conductive fillers and having significant proportion of non-accessible or non-reachable selenium or lithium polyselenide); (c) dissolution of lithium polyselenide in electrolyte and migration of dissolved lithium polyselenide from the cathode to the anode (which irreversibly react with lithium at the anode), resulting in active material loss and capacity decay (the shuttle effect); and (d) short cycle life.

In addition to overcoming the aforementioned problems, another object of the present invention is to provide a simple, cost-effective, and easy-to-implement approach to preventing potential Li metal dendrite-induced internal short circuit and thermal runaway problems in Li metal-selenide batteries.

SUMMARY OF THE INVENTION

Herein reported is a lithium-selenium secondary battery, comprising (a) an anode active material layer and an optional anode current collector supporting the anode active material layer; (b) a cathode active material layer, comprising a selenium-containing material selected from selenium, a selenium-carbon hybrid, a selenium-graphite hybrid, a selenium-graphene hybrid, a conducting polymer-selenium hybrid, a metal selenide, a Se alloy or mixture with Sn, Sb, Bi, S, or Te, a selenium compound, or a combination thereof, and an optional cathode current collector supporting the cathode active material layer; (c) an electrolyte and a porous separator layer; and (d) a discrete anode-protecting layer disposed between the anode active material layer and the porous separator (or solid-state electrolyte phase) and/or a discrete cathode-protecting layer disposed between the porous separator and the cathode active material layer; wherein the anode-protecting layer or cathode-protecting layer comprises a conductive sulfonated elastomer composite having from 0.01% to 40% by weight of a conductive reinforcement material and from 0.01% to 40% by weight of an electrochemically stable inorganic filler dispersed in a sulfonated elastomeric matrix material and said layer of conductive sulfonated elastomer composite has a thickness from 1 nm to 100 μm, a fully recoverable tensile strain from 2% to 500%, a lithium ion conductivity from $10^{-7}$ S/cm to $5\times10^{-2}$ S/cm, and an electrical conductivity from $10^{-7}$ S/cm to 100 S/cm when measured at room temperature. The electrochemically stable inorganic filler has a lithium intercalation potential no less than 1.1 V versus Li/Li$^+$ (preferably from 1.1 V to 4.5 V, more preferably from 1.1 to 3.5 V, and most preferably from 1.1 to 2.5 V).

The anode comprises an anode active material layer that comprises a layer of lithium or lithium alloy (in the form of a foil, coating, or multiple particles aggregated together) as an anode active material. The foil or coating of lithium or lithium alloy may be supported by a current collector (e.g. a Cu foil, a Ni foam, a porous layer of nanofilaments, such as graphene sheets, carbon nanofibers, carbon nanotubes, etc.). A porous separator may not be necessary if the electrolyte is a solid-state electrolyte.

The sulfonated elastomer is a high-elasticity material which exhibits an elastic deformation that is at least 2% (preferably at least 5%) when measured under uniaxial tension. In the field of materials science and engineering, the "elastic deformation" is defined as a deformation of a material (when being mechanically stressed) that is essentially fully recoverable upon release of the load and the recovery process is essentially instantaneous (no or little time delay). The elastic deformation is more preferably greater than 10%, even more preferably greater than 30%, further more preferably greater than 50%, and still more preferably greater than 100%.

Preferably, the conductive reinforcement material is selected from graphene sheets, carbon nanotubes, carbon nanofibers, carbon or graphite fibers, expanded graphite flakes, metal nanowires, conductive polymer fibers, or a combination thereof.

In some embodiments, the sulfonated elastomer composite preferably and more typically has a fully recoverable tensile strain from 5% to 300% (most typically from 10% to 150%), a thickness from 10 nm to 20 μm, a lithium ion conductivity of at least $10^{-5}$ S/cm, and an electrical conductivity of at least $10^{-3}$ S/cm when measured at room temperature on a cast thin film 20 μm thick.

Preferably, the sulfonated elastomeric matrix material contains a sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly (ethylene-co-octene) (POE) elastomer, poly(ethylene-co-butene) (PRE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

These sulfonated elastomers or rubbers, when present without graphene sheets, exhibit a high elasticity (having a fully recoverable tensile strain from 2% to 800%). In other words, they can be stretched up to 800% (8 times of the original length when under tension) and, upon release of the tensile stress, they can fully recover back to the original dimension. By adding from 0.01% to 50% by weight of a conductive reinforcement material, an inorganic filler, and/or a lithium ion-conducting species dispersed in a sulfonated elastomeric matrix material, the fully recoverable tensile strains are typically reduced down to 2%-500% (more typically from 5% to 300% and most typically from 10% to 150%).

The conducting reinforcement material is preferably in a filamentary or sheet-like form, such as a nanotube, nanofiber, nanowire, nanoplatelet, or nanodisc. In some embodiments, the conductive reinforcement material is selected from graphene sheets, carbon nanotubes, carbon nanofibers, carbon or graphite fibers, expanded graphite flakes, metal nanowires, conductive polymer fibers, or a combination thereof. These are electron-conducting materials and the sulfonated elastomer matrix is a lithium ion- and sodium ion-conducting material. By combining such a sulfonated elastomer and a conducting reinforcement, one obtains a composite that is both electron conducting and ion-conducting and capable of allowing electrons and lithium ions to migrate in and out of the particulate without much resistance.

The graphene sheets to be dispersed in a sulfonated elastomer matrix are preferably selected from pristine graphene, graphene oxide, reduced graphene oxide, graphene fluoride, graphene chloride, nitrogenated graphene, hydrogenated graphene, doped graphene, functionalized graphene, or a combination thereof. The graphene sheets preferably comprise single-layer graphene or few-layer graphene, wherein the few-layer graphene is defined as a graphene platelet formed of less than 10 graphene planes. The carbon nanotubes (CNTs) can be a single-walled CNT or multi-walled CNT. The carbon nanofibers may be vapor-grown carbon nanofibers or electrospinning based carbon nanofibers (e.g. electrospun polymer nanofibers that are subsequently carbonized).

The conducting reinforcement material is preferably in a filamentary or sheet-like form, such as a nanotube, nanofiber, nanowire, nanoplatelet, or nanodisc. In some embodiments, the conductive reinforcement material is selected from graphene sheets, carbon nanotubes, carbon nanofibers, metal nanowires, conductive polymer fibers, or a combination thereof. These are electron-conducting materials and the sulfonated elastomer matrix is a lithium ion- and sodium ion-conducting material. By combining such a sulfonated elastomer and a conducting reinforcement, one obtains a composite that is both electron conducting and ion-conducting and capable of allowing electrons and lithium ions to migrate in and out of the particulate without much resistance.

In certain embodiments, the electrically conducting material may be selected from an electron-conducting polymer, a metal particle or wire (or metal nanowire), a graphene sheet, a carbon fiber, a graphite fiber, a carbon nanofiber, a graphite nanofiber, a carbon nanotube, a graphite particle, an expanded graphite flake, an acetylene black particle, or a combination thereof. The electrically conducting material (e.g. metal nanowire, nanofiber, etc.) preferably has a thickness or diameter less than 100 nm.

In certain embodiments, the inorganic filler has a lithium intercalation potential no less than 1.1 V versus Li/Li$^+$ (preferably from 1.1 V to 4.5 V, more preferably from 1.1 to 3.5 V, and most preferably from 1.1 to 2.5 V). The presence of this inorganic filler makes the anode-protecting layer significantly more electrochemically stable.

The inorganic filler is preferably selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi.

Preferably, particles of this inorganic filler are in a form of nanoparticle, nanowire, nanofiber, nanotube, nanosheet, nanobelt, nanoribbon, nanodisc, nanoplatelet, or nanohorn having a dimension (diameter, thickness, or width, etc.) less than 100 nm, preferably less than 10 nm.

This sulfonated elastomer composite layer may be a thin film disposed against a lithium foil/coating layer surface or a thin coating deposited on the lithium foil/coating surface. It may be noted that lithium foil/coating layer may decrease in thickness due to dissolution of lithium into the electrolyte to become lithium ions as the lithium battery is discharged, creating a gap between the current collector and the protective layer if the protective layer were not elastic. Such a gap would make the re-deposition of lithium ions back to the anode impossible. We have observed that the instant sulfonated elastomer composite is capable of expanding or shrinking congruently or conformably with the anode layer. This capability helps to maintain a good contact between the current collector (or the lithium film itself) and the protective layer, enabling the re-deposition of lithium ions without interruption.

The sulfonated elastomer composite may further contain a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato) borate(LiBOB), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

At the anode side, preferably and typically, the sulfonated elastomer composite for the protective layer has a lithium ion conductivity no less than 10$^{-5}$ S/cm, more preferably no less than 10$^{-4}$ S/cm, and most preferably no less than 10$^{-3}$ S/cm. Some of the selected sulfonated elastomer composites exhibit a lithium-ion conductivity greater than 10$^{-2}$ S/cm. In some embodiments, the sulfonated elastomer composite is an elastomer containing no additive or filler dispersed therein. In others, the sulfonated elastomer composite is an elastomer matrix composite containing from 0.1% to 40% by weight (preferably from 1% to 35% by weight) of a lithium ion-conducting additive dispersed in a sulfonated elastomer matrix material. In some embodiments, the sulfonated elastomer composite contains from 0.1% by weight to 10% by weight of a reinforcement nanofilament selected from carbon nanotube, carbon nanofiber, graphene, or a combination thereof.

In some embodiments, the sulfonated elastomer matrix material is selected from a sulfonated version of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the sulfonated elastomer composite further contains a lithium ion-conducting additive dispersed in a sulfonated elastomer composite matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

The sulfonated elastomer composite may form a mixture, blend, co-polymer, or semi-interpenetrating network (semi-IPN) with an electron-conducting polymer selected from polyaniline, polypyrrole, polythiophene, polyfuran, a bi-cyclic polymer, derivatives thereof (e.g. sulfonated versions), or a combination thereof.

In some embodiments, the sulfonated elastomer composite may form a mixture, blend, or semi-IPN with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The cathode active material may be selected from Se and/or metal selenide. The selenium or metal selenide is preferably in the form of thin coating or particles preferably, having a thickness of diameter from 0.5 nm to 100 nm (more preferably from 1 nm to 10 nm). The cathode active material may further comprise a second element selected from Sn, Sb, Bi, S, Te, or a combination thereof and the weight of the second element is less than the weight of selenium. The second element may be mixed with selenium (Se) to form a mixture or alloy. The second element, the mixture, or the alloy may be preferably in a nanoparticle or nanocoating form having a diameter or thickness from 0.5 nm to 100 nm. Se, metal selenide, and/or the second element preferably resides in the pores or bonded to pore walls of a carbon-based, graphite-based, or graphene-based foam.

The cathode active material layer may further contain a resin binder and a graphite, graphene, or carbon material mixed with the Se-containing cathode active material particles. The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

In some embodiments, the invention also provides a method of manufacturing a lithium-selenium battery, the method comprising: (a) providing a cathode active material layer and an optional cathode current collector to support the cathode active material layer; (b) providing an anode active material layer (e.g. containing a lithium metal or lithium alloy foil or coating) and an optional anode current collector to support the lithium metal or lithium alloy foil or coating; (c) providing an electrolyte in contact with the anode active material layer and the cathode active material layer and an optional separator electrically separating the anode and the cathode (porous separator is normally required if the electrolyte is not a solid-state electrolyte); and (d) providing an anode-protecting layer and/or a cathode-protecting layer of a sulfonated elastomer composite having a recoverable tensile elastic strain from 2% to 800% (preferably from 5% to 300%), a lithium ion conductivity no less than $10^{-6}$ S/cm at room temperature, and a thickness from 1 nm to 100 μm (preferably from 10 nm to 10 μm). The anode-protecting layer is disposed between the lithium metal or lithium alloy foil or coating and the porous separator (or solid-state electrolyte). The cathode-protecting layer is disposed between the cathode active material layer and the porous separator (or solid-state electrolyte). The anode-protecting layer and the cathode-protecting layer may be the same or different in material compositions.

The invention also provides a method of improving the cycle-life of a lithium-selenium battery. The method comprises: (a) providing an anode containing an anode active material layer and an optional anode current collector supporting the anode active material layer; (b) providing a cathode containing a cathode active material layer optionally supported on a cathode current collector; (c) providing a porous separator layer and an electrolyte and in ionic contact with the anode active material layer and the cathode active material layer; (d) implementing a layer of conductive sulfonated elastomer composite (the cathode-protecting layer) between the cathode active material layer and the separator and/or a layer of conductive sulfonated elastomer composite (the anode-protecting layer) between the anode active layer and the separator; and (e) combining the anode layer, the cathode layer, the electrolyte and separator layer, and the anode-protecting layer and/or the cathode-protecting layer together to form the lithium-selenium cell.

The anode-protecting layer or cathode-protecting layer comprises a conductive sulfonated elastomer composite having from 0.01% to 40% by weight of a conductive reinforcement material and from 0.01% to 40% by weight of an electrochemically stable inorganic filler dispersed in a sulfonated elastomeric matrix material and said layer of conductive sulfonated elastomer composite has a thickness from 1 nm to 100 μm, a fully recoverable tensile strain from 2% to 500%, a lithium ion conductivity from $10^{-7}$ S/cm to $5\times10^{-2}$ S/cm, and an electrical conductivity from $10^{-7}$ S/cm to 100 S/cm when measured at room temperature.

The electrochemically stable inorganic filler has a lithium intercalation potential no less than 1.1 V versus $Li/Li^+$ (preferably from 1.1 V to 4.5 V, more preferably from 1.1 to 3.5 V, and most preferably from 1.1 to 2.5 V). The presence of this inorganic filler makes the anode-protecting layer significantly more electrochemically stable. The inorganic filler is preferably selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi.

In some embodiments, steps (d) and (e) may be conducted in the following manners:

1) by depositing a layer of first sulfonated elastomer composite onto one primary surface of the anode active material layer to form a protected anode and/or depositing a layer of second sulfonated elastomer composite onto one primary surface of the cathode active material layer to form a protected cathode, followed by combining the protected anode, the electrolyte/separator, and the protected cathode together to form the battery cell;
2) by depositing a layer of first sulfonated elastomer composite onto one primary surface of the separator and/or depositing a layer of second sulfonated elastomer composite onto the opposing primary surface of the separator to form a coated separator, followed by combining the anode, the coated separator, the cathode, and the electrolyte together to form the battery cell; or
3) by forming a free-standing layer of first sulfonated elastomer composite and/or a free-standing layer of second sulfonated elastomer composite, followed by laminating the anode layer, the layer of first sulfonated elastomer composite, the separator layer, the layer of second sulfonated elastomer composite, the cathode layer, along with the electrolyte to form the battery cell.

The cathode-protecting layer is implemented mainly for the purpose of reducing or eliminating the shuttling effect by preventing Se or lithium polyselenide from migrating out of the cathode zone and into the anode zone. More specifically, this layer acts to block the diffusion of any selenium and lithium polysulfide dissolved in the cathode from migrating to the anode side. This effectively reduces or eliminates the shuttling effect. This cathode-protecting layer, being highly elastic, also acts to maintain a good contact between the separator (if liquid or gel electrolyte is used) or the solid-state electrolyte and the cathode active material layer. Due to the large volume expansion/shrinkage of the Se cathode, this elastic layer expands and shrinks congruently or conformably with the cathode active material layer, thereby preventing the formation of a gap between the separator (or solid-state electrolyte) and the cathode active material layer.

The anode-protecting layer implemented between the anode active layer and the separator (or the solid-state electrolyte) is mainly for the purpose of reducing or eliminating the alkali metal dendrite by providing a more stable alkali metal-electrolyte interface that is more conducive to uniform deposition of alkali metal during battery charges. This anode-protecting layer also acts to block the penetration of any dendrite, once initiated, from reaching the separator or cathode. This anode-protecting layer, being highly elastic, also can shrink or expands responsive the thickness increase or decrease of the anode active material layer.

It is advantageous to implement both an anode-protecting layer and a cathode-protecting layer in the same lithium-selenium cell.

In the above-defined method, the step of implementing an anode-protecting layer is conducted by depositing a layer of a sulfonated elastomer composite onto one primary surface of the anode active material layer to form a protected anode, optionally compressing the protected anode to improve a contact between the anode-protecting layer and the anode active material layer, followed by combining the protected anode, the separator/electrolyte, and the cathode together to form the lithium metal secondary battery. A good contact between the anode active material layer and the anode-protecting layer is essential to uniform deposition of returning lithium ions on Li foil or the current collector.

In certain embodiments, the step of implementing an anode-protecting layer is conducted by depositing a layer of first sulfonated elastomer composite onto one primary surface of the separator to form a coated separator, followed by combining the anode, the coated separator, the cathode, and the electrolyte together to form the lithium metal secondary battery. A compressive stress may be advantageously applied (e.g. via press-rolling) to improve the contact between the anode-protecting layer and the anode active material layer to be protected.

In certain embodiments, the step of implementing an anode-protecting layer is conducted by forming a layer of a sulfonated elastomer composite, followed by laminating the anode layer, the layer of sulfonated elastomer composite, the separator layer, the cathode layer, along with the electrolyte to form the lithium metal secondary battery, wherein an optional (but desirable) compressive stress is applied to improve the contact between the anode-protecting layer and the anode active material layer during or after this laminating step.

Preferably, the sulfonated elastomer composite has a lithium-ion conductivity from $10^{-5}$ S/cm to $5 \times 10^{-2}$ S/cm. In some embodiments, the sulfonated elastomer composite has a recoverable tensile strain from 10% to 300% (more preferably >30%, and further more preferably >50%).

In certain embodiments, the procedure of providing a sulfonated elastomer composite contains providing a mixture/blend/composite of a sulfonated elastomer with an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nanofiber, and/or graphene), or a combination thereof.

In this mixture/blend/composite, the lithium ion-conducting material is dispersed in the sulfonated elastomer composite and is preferably selected from $Li_2CO_3$, $Li_2O$, $Li_2C_2O_4$, LiOH, LiX, $ROCO_2Li$, $HCOLi$, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$. In some embodiments, the lithium ion-conducting material is dispersed in the sulfonated elastomer composite and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

DESCRIPTION OF THE PREFERRED EMBODIMENTS

Figure 1:
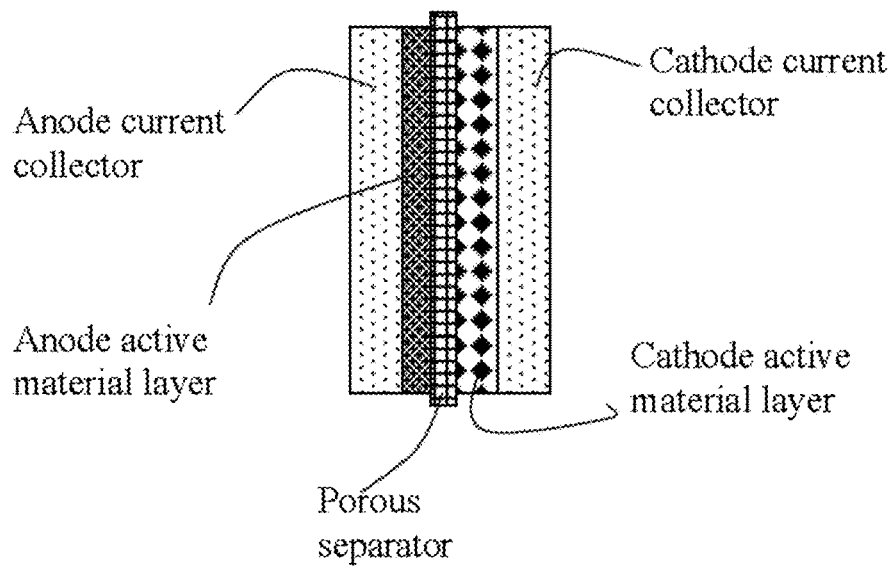
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This invention is directed at a lithium-selenium secondary battery, which is preferably based on an organic electrolyte, a polymer gel electrolyte, an ionic liquid electrolyte, a quasi-solid electrolyte, or a solid-state electrolyte. The shape of a lithium metal secondary battery can be cylindrical, square, button-like, etc. The present invention is not limited to any battery shape or configuration or any type of electrolyte.

The invention provides a lithium metal secondary battery, comprising a cathode, an anode, and electrolyte (e.g. solid-state electrolyte) or separator-electrolyte assembly (porous separator and liquid electrolyte, gel electrolyte, quasi-solid electrolyte, etc.) disposed between the cathode and the anode. The anode comprises an anode active material layer containing a lithium metal (e.g. particles, foil or coating of lithium or lithium alloy) as an anode active material. The foil or coating of lithium or lithium alloy may be supported by a current collector (e.g. a Cu foil, a Ni foam, a porous layer of nanofilaments, such as graphene sheets, carbon nanofibers, carbon nanotubes, etc. forming a 3D interconnected network of electron-conducting pathways).

In some embodiments, the cathode contains a cathode active material layer comprising a selenium-containing material, as a cathode active material, selected from selenium, a selenium-carbon hybrid, a selenium-graphite hybrid, a selenium-graphene hybrid, a conducting polymer-selenium hybrid, a metal selenide, a Se alloy or mixture with Sn, Sb, Bi, S, or Te, a selenium compound, or a combination thereof. These elements, including Se, may be supported by surfaces of a carbon material (e.g. carbon nanotube or carbon nanofiber), a graphite material (e.g. expanded graphite flakes), graphene sheets, or lodged in the pores of a porous carbon, graphite, or graphene structure (e.g. activated carbon particles, graphite foam, or graphene foam).

There is an anode-protecting layer disposed between the anode active material layer and the separator (or solid-state electrolyte) and/or there is a cathode-protecting layer between the cathode active material layer and the separator (or solid-state electrolyte). The anode-protecting layer or cathode-protecting layer contains a thin layer of a conductive sulfonated elastomer composite (anode-protecting layer) having from 0.01% to 40% by weight of a conductive reinforcement material and from 0.01% to 40% by weight of an electrochemically stable inorganic filler dispersed in a sulfonated elastomeric matrix material and this layer of conductive sulfonated elastomer composite has a thickness from 1 nm to 100 μm, a fully recoverable tensile strain from 2% to 500%, a lithium ion conductivity from $10^{-7}$ S/cm to $5 \times 10^{-2}$ S/cm, and an electrical conductivity from $10^{-7}$ S/cm to 100 S/cm when measured at room temperature. The electrochemically stable inorganic filler has a lithium intercalation potential no less than 1.1 V versus Li/Li$^+$ (preferably from 1.1 V to 4.5 V, more preferably from 1.1 to 3.5 V, and most preferably from 1.1 to 2.5 V).

The sulfonated elastomer composite-based anode-protecting layer is disposed (interposed) between the lithium metal and the porous separator (or solid-state electrolyte). The sulfonated elastomer composite-based cathode-protecting layer is disposed (interposed) between the porous separator (or solid-state electrolyte) and the cathode active layer.

Preferably, the sulfonated elastomer composite layer has a lithium ion conductivity no less than $10^{-6}$ S/cm (typically from $10^{-5}$ S/cm to $5 \times 10^{-2}$ S/cm, measured at room temperature), and a thickness from 10 nm to 20 μm.

In some embodiments, the sulfonated elastomer composite has from 0.01% to 40% by weight (based on the total weight of the sulfonated elastomer composite) of a conductive reinforcement material dispersed in a sulfonated elastomeric matrix material, wherein the conductive reinforcement material is selected from graphene sheets, carbon nanotubes, carbon nanofibers, metal nanowires, conductive polymer fibers, or a combination thereof.

The conducting reinforcement material is preferably in a filamentary or sheet-like form, such as a nanotube, nanofiber, nanowire, nanoplatelet, or nanodisc. In some embodiments, the conductive reinforcement material is selected from graphene sheets, carbon nanotubes, carbon nanofibers, carbon or graphite fibers, expanded graphite flakes, metal nanowires, conductive polymer fibers, or a combination thereof. These are electron-conducting materials and the sulfonated elastomer matrix is a lithium ion- and sodium ion-conducting material. By combining such a sulfonated elastomer and a conducting reinforcement (0-50% by weight, preferably 0.1%-30%, and more preferably 0.1-15%), one obtains a composite that is both electron conducting and ion-conducting and capable of allowing electrons and lithium ions to migrate in and out of the particulate without much resistance.

The graphene sheets to be dispersed in a sulfonated elastomer matrix are preferably selected from pristine graphene, graphene oxide, reduced graphene oxide, graphene fluoride, graphene chloride, nitrogenated graphene, hydrogenated graphene, doped graphene, functionalized graphene, or a combination thereof. The graphene sheets preferably comprise single-layer graphene or few-layer graphene, wherein the few-layer graphene is defined as a graphene platelet formed of less than 10 graphene planes. The carbon nanotubes (CNTs) can be a single-walled CNT or multi-walled CNT. The carbon nanofibers may be vapor-grown carbon nanofibers or electrospinning based carbon nanofibers (e.g. electrospun polymer nanofibers that are subsequently carbonized).

Preferably, the sulfonated elastomeric matrix material contains a sulfonated version of an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly (ethylene-co-octene) (POE) elastomer, poly(ethyl ene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

The electrochemically stable inorganic filler has a lithium intercalation potential no less than 1.1 V versus Li/Li$^+$ (preferably from 1.1 V to 4.5 V, more preferably from 1.1 to 3.5 V, and most preferably from 1.1 to 2.5 V). The presence of this inorganic filler makes the anode-protecting layer significantly more electrochemically stable. The inorganic filler is preferably selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi.

In certain embodiments, the inorganic filler for reinforcing the elastomer matrix may be selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi.

These inorganic fillers for reinforcing the elastomer shell are preferably selected to have an intercalation potential (the electrochemical potential at which lithium intercalates into these materials) higher than the intercalation potential of the active material encapsulated in the particulate. For instance, lithium intercalates into Si at approximately 0.4-0.5 V (vs. Li/Li$^+$) and the intercalation potential of lithium titanate (Li$_4$Ti$_5$O$_{12}$) is 1.1-1.5 V. The lithium titanate may be considered as a lithiated version of titanium oxide (TiO$_2$), which has a lithium intercalation potential >2.5 V. The inorganic filler must have a lithium intercalation potential higher than 1.1 V versus Li/Li$^+$, preferably higher than 1.2 V, more preferably higher than 1.4 V, and most preferably higher than 1.5 V. These electrochemical potential conditions are found to be surprisingly capable of avoiding the formation of SEI on/in the encapsulating shell and preventing repeated formation and breakage of SEI on active material particles, which otherwise would result in continued and rapid decay of battery capacity.

Other examples of metal oxide are NbO$_2$ and its lithiated version and titanium-niobium composite oxide (e.g. represented by a general formula TiNb$_2$O$_7$) and its lithiated versions. They typically have a lithium intercalation potential higher than 1.1 V versus Li/Li$^+$.

The niobium-containing composite metal oxide for use as an inorganic filler in the encapsulating elastomer shell may be selected from the group consisting of TiNb$_2$O$_7$, Li$_x$TiNb$_2$O$_7$ (0≤x≤5), Li$_x$M$_{(1-y)}$Nb$_y$Nb$_2$O$_{(7+\delta)}$ (wherein 0≤x≤6, 0≤y≤1, −1≤δ≤1, and M=Ti or Zr), Ti$_x$Nb$_y$O$_7$ (0.5≤y/x<2.0), TiNb$_x$O$_{(2+5x/2)}$ (1.9≤x<2.0), M$_x$Ti$_{(1-2x)}$Nb$_{(2+x)}$O$_{(7+\delta)}$ (wherein 0≤x≤0.2, −0.3≤δ≤0.3, and M=a trivalent metal selected from Fe, Ga, Mo, Ta, V, Al, B, and a mixture thereof), M$_x$Ti$_{(2-2x)}$Nb$_{(10+x)}$O$_{(29+\delta)}$ (wherein 0≤x≤0.4, −0.3≤δ≤0.3, and M=a trivalent metal selected from Fe, Ga, Mo, Al, B, and a mixture thereof), M$_x$TiNb$_2$O$_7$ (x<0.5, and M=B, Na, Mg, Al, Si, S, P, K, Ca, Mo, W, Cr, Mn, Co, Ni, and Fe), TiNb$_{2-x}$Ta$_x$O$_y$ (0≤x<2, 7≤y≤10), Ti$_2$Nb$_{10-v}$Ta$_v$O$_w$ (0≤v<2, 27≤y≤29), Li$_x$Ti$_{(1-y)}$M1$_y$Nb$_{(2-z)}$M2$_z$O$_{(7+\delta)}$ (wherein 0≤x≤5, 0≤y≤1, 0≤z≤2, −0.3≤δ≤0.3, M1=Zr, Si, and Sn, and M2=V, Ta, and Bi), P-doped versions thereof, B-doped versions thereof, carbon-coated versions thereof, and combinations thereof. In such a niobium-containing composite metal oxide, niobium oxide typically forms the main framework or backbone of the crystal structure, along with at least a transition metal oxide.

Transition metal oxide is but one of the many suitable inorganic filler materials for reinforcing the elastomer matrix. The inorganic filler may be selected from an oxide, carbide, boride, nitride, sulfide, phosphide, or selenide of a transition metal, a lithiated version thereof, or a combination thereof. Preferably, these and other inorganic fillers are in a form of nanoparticle, nanowire, nanofiber, nanotube, nanosheet, nanobelt, nanoribbon, nanodisc, nanoplatelet, or nanohorn having a dimension (diameter, thickness, or width, etc.) less than 100 nm, preferably less than 10 nm. These inorganic filler materials typically have a lithium intercalation potential from 1.1 V to 4.5 V versus Li/Li$^+$, and more typically and preferably from 1.1 V to 3.5 V, and most preferably from 1.1 V to 1.5 V. The lithium intercalation potential of a filler dispersed in the elastomeric matrix material may be higher than the lithium intercalation potential of the active material encapsulated by the filled elastomer.

The inorganic filler material for reinforcing an elastomer matrix material may also be selected from nanodiscs, nanoplatelets, or nanosheets (having a thickness from 1 nm to 100 nm) of: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, nickel, manganese, or any transition metal; (d) boron nitride, or (e) a combination thereof. These nanodiscs, nanoplatelets, or nanosheets preferably have a thickness less than 20 nm, more preferably from 1 nm to 10 nm.

Preferably, this anode-protecting layer or cathode-protecting layer is different in composition than the electrolyte per se as used in the lithium-selenium battery and maintains as a discrete layer (not to be dissolved in the electrolyte). Preferably, there is a close contact between the anode active material layer and the anode-protecting layer. The anode-protecting layer may contain a liquid electrolyte that permeates or impregnates into the sulfonated elastomer composite.

We have discovered that the anode-protecting layer provides several unexpected benefits: (a) the formation of dendrite has been essentially eliminated; (b) uniform deposition of lithium back to the anode side is readily achieved (no dendrite and no or little dead Li particles separated from the anode active layer; (c) the layer ensures smooth and uninterrupted transport of lithium ions from/to the lithium foil/coating and through the interface between the lithium foil/coating and the protective layer with minimal interfacial resistance; and (d) cycle stability can be significantly improved and cycle life increased. The cathode-protecting layer also acts to stop the permeation of selenium and lithium polyselenide there this protective layer (hence, preventing the shuttle effect), yet allowing diffusion of lithium ions.

In a conventional lithium-selenium cell, as illustrated in FIG. 1, the anode active material (lithium) is deposited in a thin film form or a thin foil form directly onto an anode current collector (e.g. a Cu foil). As previously discussed in the Background section, these lithium secondary batteries have the dendrite-induced internal shorting and "dead lithium" issues at the anode.

We have solved these challenging issues that have troubled battery designers and electrochemists alike for more than 30 years by developing and implementing a new anode-protecting layer disposed between the lithium foil/coating and the separator layer. This protective layer comprises a sulfonated elastomer composite having a recoverable (elastic) tensile strain no less than 2% (preferably no less than 5%) under uniaxial tension and a lithium ion conductivity no less than $10^{-6}$ S/cm at room temperature (preferably and more typically from $1\times10^{-5}$ S/cm to $5\times10^{-2}$ S/cm). The sulfonated elastomer composite contains a sulfonated elastomer composite network having a rotaxane structure or a sulfonated elastomer composite structure at a crosslink point of said sulfonated elastomer composite network.

Figure 2:
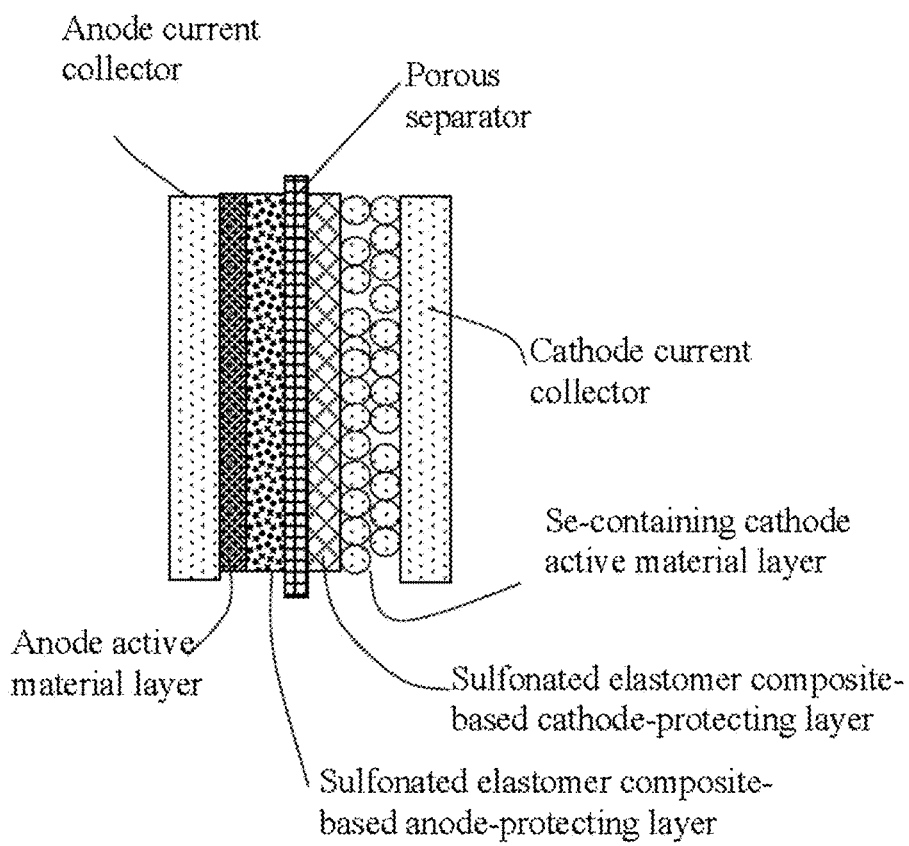
FIG. 2 Schematic of a presently invented lithium metal battery cell containing an anode layer (a thin Li foil or Li coating deposited on a surface of a current collector, Cu foil), a sulfonated elastomer composite-based anode-protecting layer, a porous separator/electrolyte layer (or a layer of solid-state electrolyte), and a cathode active material layer, which is composed of particles of a cathode active material, a conductive additive (not shown) and a resin binder (not shown). A cathode current collector supporting the cathode active layer is also shown.

As schematically shown in FIG. 2, one embodiment of the present invention is a lithium-selenium battery cell containing an anode layer (a thin Li foil or Li coating deposited on a surface of a current collector, Cu foil), a sulfonated elastomer composite-based anode-protecting layer, a porous separator, a cathode-protecting layer, and a cathode active material layer, which is composed of particles of a cathode active material (e.g. Se-containing material), a conductive additive (not shown) and a resin binder (not shown). A cathode current collector (e.g. Al foil) supporting the cathode active layer is also shown in FIG. 2. The lithium metal or alloy in the anode may be in a form of particles (e.g. surface-protected or surface-stabilized particles of Li or Li alloy).

Sulfonated elastomer composite exhibits an elastic deformation of at least 2% when measured under uniaxial tension. In the field of materials science and engineering, the "elastic deformation" is defined as a deformation of a material (when being mechanically stressed) that is essentially fully recoverable upon release of the load and the recovery is essentially instantaneous. The elastic deformation is preferably greater than 5%, more preferably greater than 10%, further more preferably greater than 30%, and still more preferably greater than 100% but less than 500%.

It may be noted that although FIG. 2 shows a lithium coating pre-existing at the anode when the lithium battery is made, this is but one embodiment of the instant invention. An alternative embodiment is a lithium-selenium battery that does not contain a lithium foil or lithium coating at the anode (only an anode current collector, such as a Cu foil or a graphene/CNT mat) when the battery is made. The needed lithium to be bounced back and forth between the anode and the cathode is initially stored in the cathode active material (e.g. lithium polyselenide; not S alone). During the first charging procedure of the lithium-selenium battery (e.g. as part of the electrochemical formation process), lithium comes out of the cathode active material, migrates to the anode side, and deposits on the anode current collector. The presence of the presently invented sulfonated elastomer composite layer enables uniform deposition of lithium ions on the anode current collector surface. Such an alternative battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of pre-storing lithium in the lithiated (lithium-containing) cathode active materials, such as and $Li_2Se_x$, makes all the materials safe to handle in a real manufacturing environment. Cathode active materials, such as $Li_2Se_x$, are typically less air-sensitive.

Preferably and typically, the sulfonated elastomer composite has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. In some embodiments, the sulfonated elastomer composite comprises from 0.1% to 40% (preferably 1% to 35%) by weight of a lithium ion-conducting additive dispersed in a sulfonated elastomer composite matrix material. The sulfonated elastomer composite must have a high elasticity (elastic deformation strain value >2%). An elastic deformation is a deformation that is fully recoverable and the recovery process is essentially instantaneous (no significant time delay). The sulfonated elastomer composite can exhibit an elastic deformation from 2% up to 800% (8 times of its original length), more typically from 5% to 500%, and further more typically from 10% to 300%, and most typically and desirably from 30% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

Further, we have unexpectedly discovered that the presence of an amount of a lithium salt (1-35% by weight) and a liquid solvent (0-50%) can significantly increase the lithium-ion conductivity.

Typically, a sulfonated elastomer composite is originally in a monomer or oligomer state that can be cured to form a cross-linked polymer that is highly elastic. Prior to curing, these polymers or oligomers are soluble in an organic solvent to form a polymer solution. An ion-conducting or electron-conducting additive may be added to this solution to form a suspension. This solution or suspension can then be formed into a thin layer of polymer precursor on a surface of an anode active material layer or an anode current collector. The polymer precursor (monomer or oligomer and initiator) is then polymerized and cured to form a lightly cross-linked polymer. This thin layer of polymer may be tentatively deposited on a solid substrate (e.g. surface of a polymer or glass), dried, and separated from the substrate to become a free-standing polymer layer. This free-standing layer is then laid on a lithium foil/coating or implemented between a lithium film/coating and electrolyte or separator. Polymer layer formation can be accomplished by using one of several procedures well-known in the art; e.g. spraying, spray-painting, printing, coating, extrusion-based film-forming, casting, etc. The cathode-protecting layer may be prepared in a similar manner.

One may dispense and deposit a layer of a sulfonated elastomer composite onto a primary surface of the anode active material layer and/or that of a cathode active material layer. Alternatively, one may dispense and deposit a layer of a sulfonated elastomer composite onto a primary surface or both primary surfaces of a porous separator layer. Further alternatively, one may prepare separate free-standing discrete layers of the sulfonated elastomer composite first. These sulfonated elastomer composite layers are then laminated together with the anode active material layer, separator/electrolyte, and the cathode layer to form a battery cell.

Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

A broad array of elastomers can be sulfonated to become sulfonated elastomers. The elastomeric material may be selected from natural polyisoprene (e.g. cis-1,4-polyisoprene natural rubber (NR) and trans-1,4-polyisoprene guttapercha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, a sulfonated elastomer composite can form a polymer matrix composite containing a lithium ion-conducting additive dispersed in the sulfonated elastomer composite matrix material, wherein the lithium ion-conducting additive is selected from $Li_2CO_3$, $Li_2O$, $Li_2C_2O_4$, LiOH, LiX, $ROCO_2Li$, $HCOLi$, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

In some embodiments, the sulfonated elastomer composite can be mixed with a lithium ion-conducting additive, which contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

The sulfonated elastomer composite may form a mixture, blend, or interpenetrating network with an electron-conducting polymer selected from polyaniline, polypyrrole, polythiophene, polyfuran, a bi-cyclic polymer, derivatives thereof (e.g. sulfonated versions), or a combination thereof. In some embodiments, the sulfonated elastomer composite may form a mixture, co-polymer, or semi-interpenetrating network with a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVdF), poly bismethoxy ethoxyethoxide-phosphazene, polyvinyl chloride, polydimethylsiloxane, poly(vinylidene fluoride)-hexafluoropropylene (PVDF-HFP), a derivative thereof (e.g. sulfonated versions), or a combination thereof.

The electrolyte for a lithium-selenium cell may be an organic liquid electrolyte, ionic liquid electrolyte, gel polymer electrolyte, solid-state electrolyte (e.g. polymer solid electrolyte or inorganic solid electrolyte), quasi-solid electrolyte or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride (KBF$_4$), sodium hexafluoroarsenide, potassium hexafluoroarsenide, sodium trifluoro-methanesulfonate (NaCF$_3$SO$_3$), potassium trifluoro-methanesulfonate (KCF$_3$SO$_3$), bis-trifluoromethyl sulfonylimide sodium (NaN(CF$_3$SO$_2$)$_2$), sodium trifluoromethanesulfonimide (NaTFSI), and bis-trifluoromethyl sulfonylimide potassium (KN(CF$_3$SO$_2$)$_2$). Among them, LiPF$_6$, LiBF$_4$ and LiN(CF$_3$SO$_2$)$_2$ are preferred for Li—S cells, NaPF$_6$ and LiBF$_4$ for Na—S cells, and KBF$_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, BF$_4^-$, B(CN)$_4^-$, CH$_3$BF$_3^-$, CH$_2$CHBF$_3^-$, CF$_3$BF$_3^-$, C$_2$F$_5$BF$_3^-$, n-C$_3$F$_7$BF$_3^-$, n-C$_4$F$_9$BF$_3^-$, PF$_6^-$, CF$_3$CO$_2^-$, CF$_3$SO$_3^-$, N(SO$_2$CF$_3$)$_2^-$, N(COCF$_3$)(SO$_2$CF$_3$)$^-$, N(SO$_2$F)$_2^-$, N(CN)$_2^-$, C(CN)$_3^-$, SCN$^-$, SeCN$^-$, CuCl$_2^-$, AlCl$_4^-$, F(HF)$_{2.3}^-$, etc. Relatively speaking, the combination of imidazolium- or sulfonium-based cations and complex halide anions such as AlCl$_4^-$, BF$_4^-$, CF$_3$CO$_2^-$, CF$_3$SO$_3^-$, NTf$_2^-$, N(SO$_2$F)$_2^-$, or F(HF)$_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a lithium metal cell.

Example 1: Sol-Gel Process for Producing Li$_x$TiNb$_2$O$_7$ (TNO) as an Inorganic Filler for the Elastomer-Based Electrode-Protecting Layer The synthesis method involves precipitating the precursor to niobium-based composite metal oxide nanoparticles from a solution reactant mixture of Nb(OH)$_5$ (dissolved in citric acid) and water-ethanol solution containing Ti(OC$_3$H$_7$)$_4$. Specifically, Nb$_2$O$_5$ was dissolved in hydrofluoric acid to form a transparent solution. In order to remove the F ions from the solution, ammonia was added to obtain a white Nb(OH)$_5$ precipitate. After the precipitate was washed and dried, the Nb(OH)$_5$ was dissolved in citric acid to form a Nb(V)-citrate solution. A water-ethanol solution containing Ti(OC$_3$H$_7$)$_4$ was added to this solution while the pH value of the solution was adjusted using ammonia. This final mixture containing Nb(V) and Ti(IV) ions was then stirred at 90° C. to form a citric gel. This gel was then heated to 140° C. to obtain a precursor, which was annealed at 900° C. and at 1350° C. to obtain the Li$_x$TiNb$_2$O$_7$ (TNO) powder.

The powder was ball-milled in a high-intensity ball mill to obtain nanoparticles of TNO, which were then dispersed in monomers/oligomers of several different elastomers (e.g. polyurethane, polybutadine, etc.) to form reacting suspensions. The monomers/oligomers were then polymerized to a controlled extent without allowing for any significant cross-linking of chains. This procedure often enables chemical bonding between the elastomer and the metal oxide particles or other inorganic filler species (particles of transition metal carbide, sulfide, selenide, phosphide, nitride, boride, etc.). These non-cured or non-crosslinked polymers were then each separately dissolved in an organic solvent to form a suspension (polymer-solvent solution plus bonded metal oxide particles and a selected conductive additive; e.g. graphene sheets). The slurry was then spray-deposited onto a lithium anode layer (or a pre-fabricated cathode electrode) or made into a thin film via coating/casting. As an anode-protecting layer, the thin film was then laminated with a lithium metal layer, along with an electrolyte/separator, and a cathode layer to form a lithium metal battery cell. As a cathode-protecting layer, the thin film was then laminated with a cathode layer, a lithium metal-based anode active layer, and an electrolyte/separator to form a lithium metal battery cell.

Example 2: Preparation of TiNb$_2$O$_7$, TiMoNbO$_7$, and TiFe$_{0.3}$Nb$_{1.7}$O$_7$ as an Inorganic Filler for the Elastomer-Based Electrode-Protecting Layer A niobium-titanium composite oxide represented by the general formula TiNb$_2$O$_7$ was synthesized, by following the following procedure: Commercially available niobium oxide (Nb$_2$O$_5$) and a titanate proton compound were used as starting materials. The titanate proton compound was prepared by immersing potassium titanate in hydrochloric acid at 25° C. for 72 hours. In the process, 1M hydrochloric acid was replaced with a 1M of fresh acid every 24 hours. As a result, potassium ions were exchanged for protons to obtain the titanate proton compound.

The niobium oxide (Nb$_2$O$_5$) and the titanate proton compound were weighed such that the molar ratio of niobium to titanium in the synthesized compound was 3. The mixture was dispersed in 100 ml of pure water, followed by vigorous mixing. The obtained mixture was placed in a heat resistant container and was subjected to hydrothermal synthesis under conditions of 180° C. for a total of 24 hours. The obtained sample was washed in pure water three times, and then dried. The sample was then subjected to a heat treatment at 1,100° C. for 24 hours to obtain $TiNb_2O_7$.

Additionally, a niobium-molybdenum-titanium composite oxide was synthesized in the same manner as above except that niobium oxide ($Nb_2O_5$), molybdenum oxide ($Mo_2O_5$), and a titanate proton compound were weighed such that the molar ratio of niobium to titanium and that of molybdenum to titanium in the synthesized compound was 1.5 and 1.5, respectively. As a result, a niobium-molybdenum-titanium composite oxide ($TiMoNbO_7$) was obtained.

In addition, a niobium-Iron-titanium composite oxide was synthesized in the same manner as above except that niobium oxide ($Nb_2O_5$), a titanate proton compound, and iron oxide ($Fe_2O_3$) were weighed such that the molar ratio of niobium to titanium and of iron to titanium in the synthesized compound was 3 and 0.3, respectively. As a result, a niobium-titanium composite oxide ($TiFe_{0.3}Nb_{1.7}O_7$) was obtained.

The above niobium-containing composite metal oxide powders ($TiNb_2O_7$, $TiMoNbO_7$, and $TiFe_{0.3}Nb_{1.7}O_7$) were separately added into a monomer of synthetic polyisoprene and a mixture of monomers for urethane-urea copolymer, respectively. Polymerization of the respective reacting mass was initiated and proceeded to obtain linear chains without crosslinking.

This step was found to create some bonding between the composite metal oxide particles. Subsequently, these substantially linear chains were dissolved in a solvent (e.g. benzene and DMAc) to form a solution and a desired amount of graphene sheets or CNTs was added to form a slurry. The slurry was then cast into thin films for use as an anode- or cathode-protecting layer.

Example 3: Preparation of $Ga_{0.1}Ti_{0.8}Nb_{2.1}O_7$ as an Inorganic Filler for the Elastomer Layer In an experiment, 0.125 g of $GaCl_3$ and 4.025 g of $NbCl_5$ were dissolved in 10 mL of anhydrous ethanol under an inert atmosphere (argon) and magnetic stirring. The solution was transferred under air. Then, added to this solution was 6.052 g solution of titanium oxysulfate ($TiOSO_4$) at 15% by mass in sulfuric acid, followed by 10 mL of ethanol to dissolve the precursors under a magnetic stirring. The pH of the solution was adjusted to 10 by slow addition of ammonia $NH_3$ at 28% by mass into water.

The paste was transferred into a Teflon container having a 90-mL capacity, which was then placed in an autoclave. The paste was then heated up to 220° C. for 5 hours with a heating and cooling ramp of 2 and 5 degrees C./min, respectively. The paste was then washed with distilled water by centrifugation until a pH between 6 and 7 was obtained. The resulting compound was heated at 60° C. for 12 hours and then ball-milled for 30 min at 500 rpm (revolutions per minute) in hexane. After evaporation of the solvent, the powder was calcinated at 950° C. for 1 hour with a heating/cooling ramp of 3 degrees C./min to produce crystals of $Ga_{0.1}Ti_{0.8}Nb_{2.1}O_7$. These particles were used as an inorganic filler to reinforce an elastomer matrix.

Example 4: Preparation of $Fe_{0.1}Ti_{0.8}Nb_{2.1}O_7$ Powder as a Filler for Elastomer In a representative procedure, 0.116 g of $FeCl_3$ and 4.025 g of $NbCl_5$ were dissolved in 10 mL of anhydrous ethanol under an inert atmosphere (argon) and magnetic stirring. The resulting solution was transferred under air. Then, added to this solution was 6.052 g of titanium oxysulfate ($TiOSO_4$) at 15% by mass in sulfuric acid and 10 mL of ethanol to dissolve the precursors under a magnetic stirring. The pH of the solution was adjusted to 10 by slow addition of ammonia $NH_3$ at 28% by mass into water.

The paste was transferred into a Teflon container having a 90-mL capacity, which was then placed in an autoclave. The paste was then heated up to 220° C. for 5 hours with a heating and cooling ramp of 2 and 5 degrees C./min, respectively. The paste was then washed with distilled water by centrifugation until a pH between 6 and 7 was obtained. The compound was heated at 60° C. for 12 hours and then ball-milled for 30 min at 500 rpm in hexane. After evaporation of hexane, the powder was calcinated at 950° C. for 1 hour with a heating/cooling ramp of 3 degrees C./min to obtain $Fe_{0.1}Ti_{0.8}Nb_{2.1}O_7$ crystals for use as an inorganic filler in an elastomer matrix Example 5: Production of Molybdenum Diselenide Nanoplatelets (as an Inorganic Filler) Using Direct Ultrasonication A sequence of steps can be utilized to form nanoplatelets from many different types of layered compounds: (a) dispersion of a layered compound in a low surface tension solvent or a mixture of water and surfactant, (b) ultrasonication, and (c) an optional mechanical shear treatment. For instance, dichalcogenides ($MoSe_2$) consisting of Se—Mo—Se layers held together by weak van der Waals forces can be exfoliated via the direct ultrasonication process invented by our research group. Intercalation can be achieved by dispersing $MoSe_2$ powder in a silicon oil beaker, with the resulting suspension subjected to ultrasonication at 120 W for two hours. The resulting $MoSe_2$ platelets were found to have a thickness in the range from approximately 1.4 nm to 13.5 nm with most of the platelets being mono-layers or double layers.

Other single-layer platelets of the form $MX_2$ (transition metal dichalcogenide), including $MoS_2$, $TaS_2$, $ZrS_2$, and $WS_2$, were similarly exfoliated and separated. Again, most of the platelets were mono-layers or double layers when a high sonic wave intensity was utilized for a sufficiently long ultrasonication time.

Example 6: Production of $ZrS_2$ Nanodiscs as an Inorganic Filler for the Elastomer Layer In a representative procedure, zirconium chloride ($ZrCl_4$) precursor (1.5 mmol) and oleylamine (5.0 g, 18.7 mmol) were added to a 25-mL three-neck round-bottom flask under a protective argon atmosphere. The reaction mixture was first heated to 300° C. at a heating rate of 5° C./min under argon flow and subsequently $CS_2$ (0.3 mL, 5.0 mmol) was injected. After 1 h, the reaction was stopped and cooled down to room temperature. After addition of excess butanol and hexane mixtures (1:1 by volume), 18 nm $ZrS_2$ nanodiscs (~100 mg) were obtained by centrifugation. Larger sized nanodiscs $ZrS_2$ of 32 nm and 55 nm were obtained by changing reaction time to 3 h and 6 h, respectively otherwise under identical conditions.

Example 7: Preparation of Boron Nitride Nanosheets as a Filler for the Elastomer Layer Five grams of boron nitride (BN) powder, ground to approximately 20 μm or less in sizes, were dispersed in a strong polar solvent (dimethyl formamide) to obtain a suspension. An ultrasonic energy level of 85 W (Branson S450

Ultrasonicator) was used for exfoliation, separation, and size reduction for a period of 1-3 hours. This is followed by centrifugation to isolate the BN nanosheets. The BN nanosheets obtained were from 1 nm thick (≤3 atomic layers) up to 7 nm thick.

Example 8: Sulfonation of Triblock Copolymer Poly(Styrene-Isobutylene-Styrene) or SIBS An example of the sulfonation procedure used in this study is summarized as follows: a 10% (w/v) solution of SIBS (50 g) and a desired amount of graphene oxide sheets (0.15% to 40.5% by wt.) in methylene chloride (500 ml) was prepared. The solution was stirred and refluxed at approximately 40 8 C, while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before being added to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50° C. for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (LECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) with concentrations ranging from 0.5 to 2.5% (w/v). Desired amounts of graphene sheets and inorganic filler (if not added at an earlier stage) were then added into the solution to form slurry samples. The slurry samples were slot-die coated into layers of sulfonated elastomer composite.

Example 9: Synthesis of Sulfonated Polybutadiene (PB) by Free Radical Addition of Thiolacetic Acid (TAA) Followed by In Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) and a desired amount of graphene sheets (0.1%-40% by wt.) were introduced into the reactor, and the polymer solution was irradiated for 1 h at room temperature with UV light of 365 nm and power of 100 W.

The resulting thioacetylated polybutadiene (PB-TA)/graphene composite was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of anode active material particles, from 10 to 100 grams) were added to the toluene solution of PB-TA at 50° C. followed by slow addition of 52.6 mL of hydrogen peroxide (35 wt %; 0.61 mol; $H_2O_2$/olefin molar ratio=5) in 20 min. We would like to caution that the reaction is autocatalytic and strongly exothermic. The resulting slurry was spray-dried to obtain sulfonated polybutadiene (PB-SA)/graphene composite layers.

It may be noted that graphene sheets may be added at different stages of the procedure: before, during or after BZP is added or before/during/after the inorganic filler is added.

Example 10: Synthesis of Sulfonated SBS

Sulfonated styrene-butadiene-styrene triblock copolymer (SBS) based elastomer was directly synthesized. First, SBS (optionally along with graphene sheets) is first epoxidized by performic acid formed in situ, followed by ring-opening reaction with an aqueous solution of $NaHSO_3$. In a typical procedure, epoxidation of SBS was carried out via reaction of SBS in cyclohexane solution (SBS concentration=11 g/100 mL) with performic acid formed in situ from HCOOH and 30% aqueous $H_2O_2$ solution at 70° C. for 4 h, using 1 wt % poly(ethylene glycol)/SBS as a phase transfer catalyst. The molar ratio of $H_2O_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt % TEAB/ESBS as a phase transfer catalyst and 5 wt % DMA/ESBS as a ring-opening catalyst. Herein, TEAB=tetraethyl ammonium bromide and DMA=N,N-dimethyl aniline. An aqueous solution of $NaHSO_3$ and $Na_2SO_3$ (optionally along with graphene sheets or CNTs, if not added earlier) was then added with vigorous stirring at 60° C. for 7 h at a molar ratio of $NaHSO_3$/epoxy group at 1.8 and a weight ratio of $Na_2SO_3$/$NaHSO_3$ at 36%. This reaction allows for opening of the epoxide ring and attaching of the sulfonate group according to the following reaction:

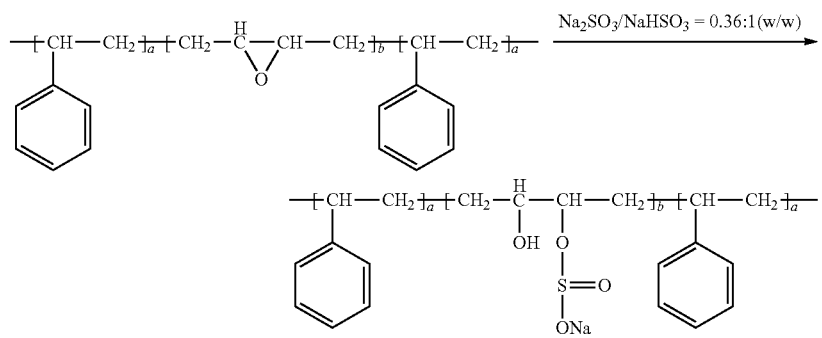

The reaction was terminated by adding a small amount of acetone solution containing antioxidant. The mixture was washed with distilled water and then precipitated by ethanol while being cast into thin films, followed by drying in a vacuum dryer at 50° C. It may be noted that graphene sheets (or CNTs, etc.) and inorganic filler may be added during various stages of the aforementioned procedure (e.g. right from the beginning, or prior to the ring opening reaction).

Example 11: Synthesis of Sulfonated SBS by Free Radical Addition of Thiolacetic Acid (TAA) Followed by In Situ Oxidation with Per-Formic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample (S(B-TA)S), 20 mL of the polymer solution was treated with plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; $H_2O_2$/olefin molar ratio=5.5) were added in about 15 min. It may be cautioned that the reaction is autocatalytic and strongly exothermic! The conductive reinforcement material and/or an inorganic filler was added before or after this reaction. The resulting slurry was stirred for 1 h, and then most of the solvent was distilled off in vacuum at 35° C. Finally, the slurry containing the sulfonated elastomer was added with acetonitrile, cast into films, washed with fresh acetonitrile, and dried in vacuum at 35° C. to obtain layers of sulfonated elastomers.

Other elastomers (e.g. polyisoprene, EPDM, EPR, polyurethane, etc.) were sulfonated in a similar manner. Alternatively, all the rubbers or elastomers can be directly immersed in a solution of sulfuric acid, a mixture of sulfuric acid and acetyl sulfate, or other sulfonating agent discussed above to produce sulfonated elastomers/rubbers. Again, graphene sheets (or other conductive reinforcement material) and inorganic filler may be added at various stages of the procedure.

Example 12: Expanded Multi-Walled Carbon Nanotubes (MWCNTs) as a Supporting and Protective Porous Backbone for Selenium Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. Expanded MWCNTs, alone or in combination with another particulate carbon/graphite material, can be packed into a mesoporous structure for supporting the selenium material.

Example 13: Electrochemical Deposition of Se on Various Webs or Paper Structures (External Electrochemical Deposition) for Li—Se Batteries The electrochemical deposition may be conducted before the cathode active layer is incorporated into a lithium-selenium battery cell. In this approach, the anode, the electrolyte, and the integral layer of mesoporous structure (serving as a cathode layer) are positioned in an external container outside of a lithium-selenium cell. The needed apparatus is similar to an electro-plating system, which is well-known in the art.

In a typical procedure, a metal polyselenide ($M_xSe_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polyselenide in this desired solvent. A greater solubility would mean a larger amount of selenium can be derived from the electrolyte solution.

The electrolyte solution is then poured into a chamber or reactor under a dry and controlled atmosphere condition (e.g. He or Nitrogen gas). A Li metal foil can be used as the anode and a layer of the mesoporous structure as the cathode; both being immersed in the electrolyte solution. This configuration constitutes an electrochemical deposition system. The step of electrochemically depositing nanoscaled selenium particles or coating in the mesopores is conducted at a current density preferably in the range from 1 mA/g to 10 A/g, based on the layer weight of the mesoporous structure.

The chemical reactions that occur in this reactor may be represented by the following equation: $M_xSe_y \rightarrow M_xSe_{y-z} + zSe$ (typically z=1-4). Quite surprisingly, the precipitated Se is preferentially nucleated and grown on massive internal surfaces of mesopores to form nanoscaled coating or nanoparticles. The coating thickness or particle diameter and the amount of Se coating/particles may be controlled by the specific surface area, electro-chemical reaction current density, temperature and time. In general, a lower current density and lower reaction temperature lead to a more uniform distribution of Se and the reactions are easier to control. A longer reaction time leads to a larger amount of Se deposited on graphene surfaces and the reaction is ceased when the selenium source is consumed or when a desired amount of Se is deposited.

Example 14: Electrochemical Deposition of Se on Various Mesoporous Webs or Paper-Based Cathode Structures in Li—Se Batteries (Internal Electrochemical Deposition)

As an alternative to the external electrochemical deposition, an internal electrochemical conversion and deposition of Se from an electrolyte-borne selenium source onto massive internal surfaces of mesoporous structures was also conducted using a broad array of mesoporous structures. As a typical procedure, the anode, the electrolyte, and the integral layer of mesoporous structure are packaged inside a housing to form a lithium-selenium cell. In such a configuration, the battery cell itself is an electrochemical deposition system for pre-selennization of the cathode and the step of electrochemically depositing nanoscaled selenium particles or coating on the internal surfaces occurs after the lithium-selenium cell is fabricated and conducted during the first charge cycle of the Li—Se cell.

As a series of examples, lithium polyselenide ($Li_xSe_y$)— and sodium polyselenide ($Na_xSe_y$)-containing electrolytes with desired x and y values (e.g. x=2, and y=6-10) dissolved in solvent were prepared by chemically reacting stoichiometric amounts of selenium and $Li_2Se$ or $Na_2Se$ in polyselenide free electrolyte of 0.5 M $LiTFSI+0.2$ M $LiNO_3$ (or 0.5 M $NaTFSI+0.2$ M $NaNO_3$) in DOL/DME (1:1, v:v). The electrolyte was stirred at 75° C. for 3-7 hours and then at room temperature for 48 hours. The resulting electrolytes contain different $Li_xSe_y$ or $Na_xSe_y$ species (e.g. x=2, and y=6-10, depending upon reaction times and temperatures), which are intended for use as a selenium source in a battery cell.

In a Li—Se cell, one of these electrolytes was selected to combine with an anode current collector (Cu foil), an anode layer (e.g. Li metal foil), a porous separator, a layer of porous graphene structure, and a cathode current collector (Al foil) to form a Li—Se cell. The cell was then subjected to a first charge procedure using a current density ranging from 5 mA/g to 50 A/g. The best current density range was found to be from 50 mA/g to 5 A/g.

Example 15: Effects of the Anode-Protecting Layer and/or the Cathode-Protecting Layer The sulfonated elastomer composite films for anode protection were SIBS as prepared in Example 8. Several tensile testing specimens were cut from the film and tested with a universal testing machine. The results indicate that this series of sulfonated elastomer films have an elastic deformation from approximately 150% to 465%. The addition of up to 30% by weight of a conductive reinforcement material (CNTs, graphene, CNFs, etc.) typically reduces this elasticity down to a reversible tensile strain from 7% to 130%.

For electrochemical testing, the working electrodes (cathode layers) were prepared by impregnating Se into a sheet of expanded CNT mat. Electrochemical measurements were carried out using CR2032 (3V) coin-type cells with lithium metal as the counter electrode (actually an anode of a Li—Se cell), Celgard 2400 membrane as separator, and 1 M $LiPF_6$ electrolyte solution dissolved in a mixture of ethylene carbonate (EC) and diethyl carbonate (DEC) (EC-DEC, 1:1 v/v). Four Li—Se cells were prepared: one including an anode-protecting layer (sulfonated SIBS elastomer composite prepared as in Example 1), one including a cathode-protecting layer (sulfonated PB composite as prepared in Example 2), one including both an anode-protecting layer and a cathode-protecting layer, and one including no electrode-protecting layer (the baseline cell). The cell assembly was performed in an argon-filled glove-box. The CV measurements were carried out using a CH-6 electrochemical workstation at a scanning rate of 1 mV/s. The electrochemical performance of the cell featuring sulfonated elastomer composite binder and that containing PVDF binder were evaluated by galvanostatic charge/discharge cycling at a current density of 50 mA/g using an Arbin electrochemical workstation.

Figure 3:
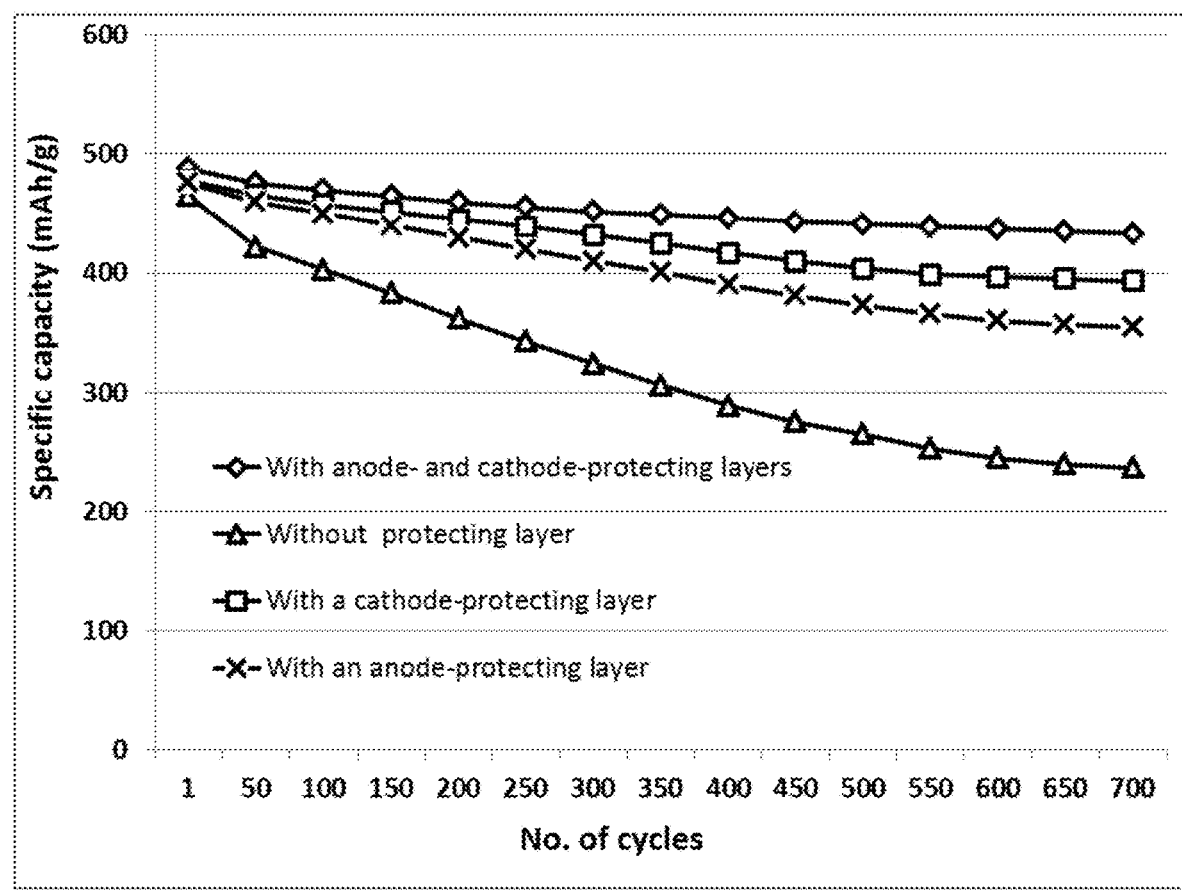
FIG. 3 The cathode specific intercalation capacity curves of four Li—Se cells: one including an anode-protecting layer (sulfonated SIBS elastomer composite prepared as in Example 1), one including a cathode-protecting layer (sulfonated PB composite as prepared in Example 2), one including both an anode-protecting layer and a cathode-protecting layer, and one including no electrode-protecting layer (the baseline cell).

Summarized in FIG. 3 are the cathode specific intercalation capacity curves of these four lithium-selenium cells. As the number of cycles increases, the specific capacity of the unprotected cell drops at the fastest rate. In contrast, the presently invented filled sulfonated elastomer composite protection layer provides the battery cell with a significantly more stable and high specific capacity for a large number of cycles. These data have clearly demonstrated the surprising and superior performance of the presently invented sulfonated elastomer composite protection approach. The configuration containing both the anode-protecting layer and the cathode-protecting layer provides the best cycle stability (longest cycle-life), followed by the one containing a cathode-protecting layer, and then the one containing an anode-protecting layer.

The sulfonated elastomer composite-based anode-protecting layer appears to be capable of reversibly deforming to a great extent without breakage when the lithium foil decreases in thickness during battery discharge. The anode-protecting layer also prevents the continued reaction between liquid electrolyte and lithium metal at the anode, reducing the problem of continuing loss in lithium and electrolyte. This also enables a significantly more uniform deposition of lithium ions upon returning from the cathode during a battery re-charge step; hence, no lithium dendrite. These were observed by using SEM to examine the surfaces of the electrodes recovered from the battery cells after some numbers of charge-discharge cycles.

The cathode-protecting layer acts to block or capture the Se and lithium polyselenide species dissolved in the electrolyte, preventing these species from migrating to the anode side. This elastic layer also helps to maintain a good contact with both the separator layer and the cathode active material layer, thereby maintaining good lithium ion pathways without interruption.

Example 16: Sulfonated Elastomer Composite Implemented in the Anode of a Li—Se Cell The Li—Se cell initially contained an anode active material layer having an ultra-thin lithium layer (approximately 1.1 μm thick) and a cathode active material layer containing lithium selenide-coated graphene paper mat prepared in Example 13 when the cell was made. During the first charging step (the formation procedure), massive lithium ions migrated out of the cathode and deposited onto the initially thin lithium layer. The anode-protecting sulfonated elastomer composite as a lithium-protecting layer was based on the sulfonated polybutadiene (PB) prepared according to a procedure used in Example 9. Tensile testing was also conducted on the sulfonated elastomer films (without the conductive reinforcement material). This series of sulfonated elastomers can be elastically stretched up to approximately 135% (having some lithium salt or conductive reinforcement material dispersed therein) or up to 770% (with no additive).

Figure 4:
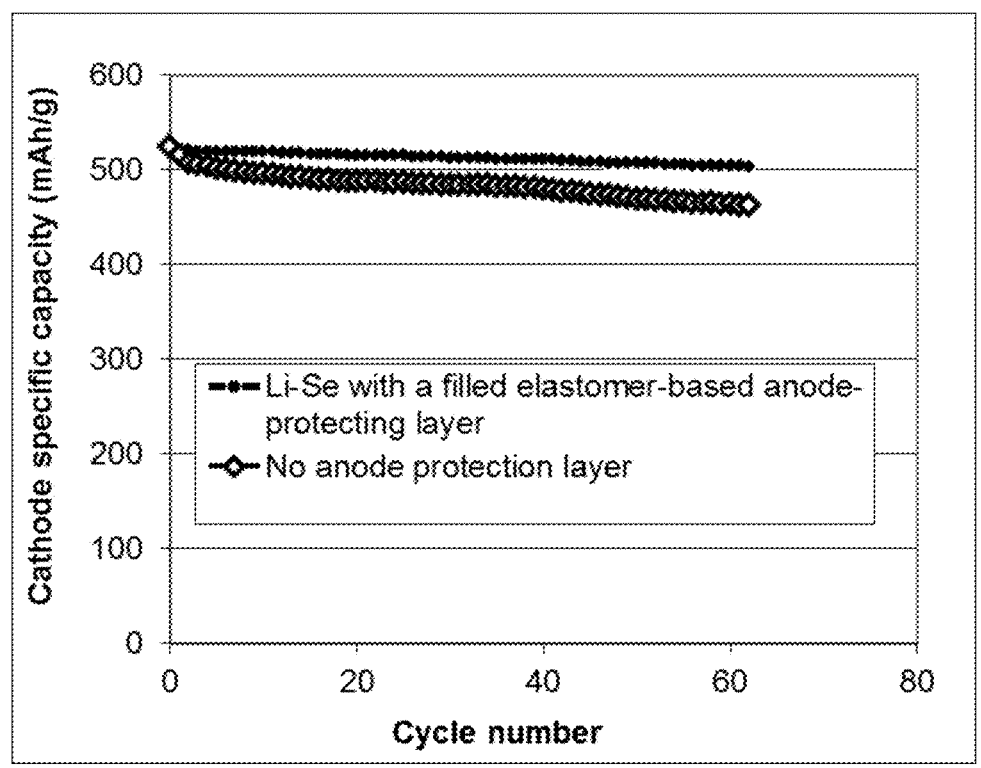
FIG. 4 The specific capacity values of two lithium-selenium cells (initially the cell being lithium-free): one featuring a sulfonated elastomer composite-based anode-protecting layer and the other no anode-protecting layer.

FIG. 4 shows that the cell having an anode-protecting polymer layer offers a significantly more stable cycling behavior. The sulfonated elastomer composite also acts to isolate the electrolyte from the lithium coating yet still allowing for easy diffusion of lithium ions.

Example 17: Effect of Lithium Ion-Conducting Additive in a Sulfonated Elastomer Composite A wide variety of lithium ion-conducting additives were added to several different elastomer matrix materials to prepare anode or cathode protection layers. The lithium ion conductivity values of the resulting complex materials are summarized in Table 1 below. We have discovered that these composite materials are suitable electrode-protecting layer materials provided that their lithium ion conductivity at room temperature is no less than $10^{-6}$ S/cm. With these materials, lithium ions appear to be capable of readily diffusing through the protective layer having a thickness no greater than 1 μm. For thicker polymer films (e.g. 10 μm), a lithium ion conductivity at room temperature of these sulfonated elastomer composites no less than $10^{-4}$ S/cm would be required.

TABLE 1

Lithium ion conductivity of various sulfonated elastomer composite compositions as a lithium metal-protecting layer.

| Sample No. | Lithium-conducting additive | % sulfonated elastomer (1-2 μm thick) | Li-ion conductivity (S/cm) |
|---|---|---|---|
| E-1p | $Li_2CO_3$ + $(CH_2OCO_2Li)_2$ | 70-99% | $1.3 \times 10^{-4}$ to $3.3 \times 10^{-3}$ S/cm |
| B1p | LiF + LiOH + $Li_2C_2O_4$ | 60-90% | $4.2 \times 10^{-5}$ to $2.6 \times 10^{-3}$ S/cm |
| B2p | LiF + HCOLi | 80-99% | $1.2 \times 10^{-4}$ to $1.4 \times 10^{-3}$ S/cm |
| B3p | LiOH | 70-99% | $8.5 \times 10^{-4}$ to $1.1 \times 10^{-2}$ S/cm |
| B4p | $Li_2CO_3$ | 70-99% | $4.3 \times 10^{-3}$ to $9.5 \times 10^{-3}$ S/cm |
| B5p | $Li_2C_2O_4$ | 70-99% | $8.2 \times 10^{-4}$ to $1.3 \times 10^{-2}$ S/cm |
| B6p | $Li_2CO_3$ + LiOH | 70-99% | $1.5 \times 10^{-3}$ to $1.7 \times 10^{-2}$ S/cm |
| C1p | $LiClO_4$ | 70-99% | $4.0 \times 10^{-4}$ to $2.2 \times 10^{-3}$ S/cm |
| C2p | $LiPF_6$ | 70-99% | $2.1 \times 10^{-4}$ to $6.2 \times 10^{-3}$ S/cm |
| C3p | $LiBF_4$ | 70-99% | $1.2 \times 10^{-4}$ to $1.7 \times 10^{-3}$ S/cm |
| C4p | LiBOB + $LiNO_3$ | 70-99% | $1.4 \times 10^{-4}$ to $3.2 \times 10^{-3}$ S/cm |
| S1p | Sulfonated polyaniline | 85-99% | $3.2 \times 10^{-5}$ to $9.5 \times 10^{-4}$ S/cm |
| S2p | Sulfonated PEEK | 85-99% | $1.4 \times 10^{-4}$ to $1.3 \times 10^{-3}$ S/cm |
| S3p | Sulfonated PVDF | 80-99% | $1.7 \times 10^{-4}$ to $1.5 \times 10^{-4}$ S/cm |
| S4p | Polyethylene oxide | 80-99% | $4.2 \times 10^{-4}$ to $3.4 \times 10^{34}$ S/cm |

In lithium battery industry, it is a common practice to define the cycle life of a battery as the number of charge-discharge cycles that the battery suffers a 20% decay in capacity based on the initial capacity measured after the required electrochemical formation. After an extensive investigation, we have come to observe that the cycle-life of a lithium-selenium cell is typically in the range from 500-2,500 cycles when at least an electrode-protecting layer is implemented. In contrast, the typical cycle life of an unprotected Li—Se cell is typically in the range from 150-35 cycles.

We claim:

1. A lithium-selenium secondary battery comprising a cathode, an anode, and a porous separator or electrolyte disposed between said cathode and said anode, wherein said cathode and wherein said anode comprises:
   (a) an anode active material layer, comprising a layer of lithium or lithium alloy, in a form of a foil, coating, or multiple particles aggregated together, as an anode active material, and an optional anode current collector supporting said anode active material layer;
   (b) a cathode active material layer, comprising a selenium-containing material as a cathode active material, selected from the group consisting of selenium, selenium-carbon hybrid, a selenium-graphite hybrid, selenium-graphene hybrid, conducting polymer-selenium hybrid, metal selenide, Se alloys or mixtures with Sn, Sb, Bi, S, or Te, selenium compounds, and combinations thereof, and an optional cathode current collector supporting said cathode active material layer;
   (c) an electrolyte and a porous separator layer; and
   (d) a discrete anode-protecting layer disposed between said anode active material layer and said porous separator and/or a discrete cathode-protecting layer disposed between the porous separator and the cathode active material layer;
   wherein said anode-protecting layer or cathode-protecting layer comprises a conductive sulfonated elastomer composite having from 0.01% to 40% by weight of a conductive reinforcement material and from 0.01% to 40% by weight of an electrochemically stable inorganic filler dispersed in a sulfonated elastomeric matrix material and said layer of conductive sulfonated elastomer composite has a thickness from 1 nm to 100 μm, a fully recoverable tensile strain from 2% to 500%, a lithium ion conductivity from $10^{-7}$ S/cm to $5 \times 10^{-2}$ S/cm, and an electrical conductivity from $10^{-7}$ S/cm to 100 S/cm when measured at room temperature and wherein said inorganic filler has a lithium intercalation potential from 1.1 V to 4.5 V versus Li/Li$^+$ and is selected from an oxide, carbide, boride, nitride, sulfide, phosphide, or selenide of a transition metal, a lithiated version thereof, or a combination thereof.

2. The lithium-selenium secondary battery of claim 1, wherein said transition metal is selected from the group consisting of Ti, V, Cr, Mn, Fe, Co, Ni, Cu, Zn, Y, Zr, Nb, Mo, Pd, Ag, Cd, La, Ta, W, Pt, Au, Hg, combinations thereof, or combinations thereof with Al, Ga, In, Sn, Pb, Sb, or Bi.

3. The lithium-selenium secondary battery of claim 1, wherein said electrochemically stable inorganic filler is selected from nanodiscs, nanoplatelets, or nanosheets of (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, nickel, manganese, or any transition metal; (d) boron nitride, or (e) a combination thereof, wherein said nanodiscs, nanoplatelets, or nanosheets have a thickness from 1 nm to 100 nm.

4. The lithium-selenium secondary battery of claim 1, wherein said conductive reinforcement material is selected from the group consisting of graphene sheets, carbon nanotubes, carbon nanofibers, carbon or graphite fibers, expanded graphite flakes, metal nanowires, conductive polymer fibers, and combinations thereof.

5. The lithium-selenium secondary battery of claim 1, wherein said sulfonated elastomeric matrix material comprises sulfonated versions of the group consisting of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly (ethylene-co-octene) elastomer, poly(ethylene-co-butene)

elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, and combinations thereof.

6. The lithium-selenium secondary battery of claim 4, wherein said graphene sheets are selected from the group consisting of pristine graphene, graphene oxide, reduced graphene oxide, graphene fluoride, graphene chloride, nitrogenated graphene, hydrogenated graphene, doped graphene, functionalized graphene, and combinations thereof.

7. The lithium-selenium secondary battery of claim 4, wherein said graphene sheets comprise single-layer graphene or few-layer graphene.

8. The lithium-selenium secondary battery of claim 4, wherein said graphene sheets have a length or width between 5 nm to 5 μm.

9. The lithium-selenium secondary battery of claim 1, wherein said sulfonated elastomer composite further comprises from 0.1% to 40% by weight of a lithium ion-conducting additive dispersed therein.

10. The lithium-selenium secondary battery of claim 1, wherein said sulfonated elastomer composite further comprises a lithium ion-conducting additive dispersed therein and said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$ and $1\leq y\leq4$.

11. The lithium-selenium secondary battery of claim 1, wherein said conductive reinforcement material is selected from the group consisting of electron-conducting polymer, a metal particle or wire, a graphene sheet, a carbon fiber, a graphite fiber, a carbon nanofiber, a graphite nanofiber, a carbon nanotube, a graphite particle, an expanded graphite flake, an acetylene black particle, and combinations thereof.

12. The lithium-selenium secondary battery of claim 11, wherein said conductive reinforcement material has a thickness or diameter less than 100 nm.

13. The lithium-selenium secondary battery of claim 1, wherein said sulfonated elastomer composite further comprises a lithium salt dispersed therein and said lithium salt is selected from the group consisting of lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

14. The lithium-selenium secondary battery of claim 1, wherein said sulfonated elastomer composite further comprises a mixture of said sulfonated elastomer and an electron-conducting polymer selected from the group consisting of polyaniline, polypyrrole, polythiophene, polyfuran, a bi-cyclic polymer, a sulfonated derivative thereof, and combinations thereof.

15. The lithium-selenium secondary battery of claim 1, wherein the sulfonated elastomer composite forms a mixture or blend with a lithium ion-conducting polymer selected from the group consisting of poly(ethylene oxide) (PEO), polypropylene oxide (PPO), poly(acrylonitrile) (PAN), poly (methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP), a sulfonated derivative thereof, and combinations thereof.

16. The lithium-selenium secondary battery of claim 1, wherein said anode-protecting layer or said cathode-protecting layer has a thickness from 1 nm to 10 μm.

17. The lithium-selenium battery of claim 1, wherein said electrolyte is selected from a polymer electrolyte, polymer gel electrolyte, composite electrolyte, ionic liquid electrolyte, non-aqueous liquid electrolyte, soft matter phase electrolyte, quasi-solid electrolyte, solid-state electrolyte, or a combination thereof.

18. The lithium-selenium battery of claim 1, wherein said electrolyte comprises an alkali salt selected from the group consisting of lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$, lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-methanesulfonate ($NaCF_3SO_3$), potassium trifluoro-methanesulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), and combinations thereof.

19. The lithium-selenium battery of claim 1, wherein said electrolyte contains a solvent selected from the group consisting of ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, and combinations thereof.

* * * * *